(12) United States Patent
Velde et al.

(10) Patent No.: US 7,589,868 B2
(45) Date of Patent: Sep. 15, 2009

(54) METHOD AND APPARATUS FOR CREATING 3D-PRINTS AND A 3-D PRINTING SYSTEM

(75) Inventors: Koen Vande Velde, Duffel (BE); Paul Delabastita, Antwerp (BE); Luc Minnebo, Brasschaat (BE); Erik Van geel, Hove (BE); Wim Helsen, Herentals (BE); Kris Vangeel, Geel (BE)

(73) Assignee: Agfa Graphics NV, Mortsel (BE)

( * ) Notice: Subject to any disclaimer, the term of this patent is extended or adjusted under 35 U.S.C. 154(b) by 841 days.

(21) Appl. No.: 10/732,042

(22) Filed: Dec. 10, 2003

(65) Prior Publication Data

US 2004/0183796 A1 Sep. 23, 2004

Related U.S. Application Data

(60) Provisional application No. 60/436,824, filed on Dec. 27, 2002.

(30) Foreign Application Priority Data

Dec. 11, 2002 (EP) .................... 02102715

(51) Int. Cl.
*H04N 1/405* (2006.01)
*G06F 19/00* (2006.01)

(52) U.S. Cl. .............. 358/3.3; 358/1.9; 358/3.06; 358/3.07; 358/3.09; 358/3.13; 358/3.26; 358/3.29; 700/118; 700/119; 700/120

(58) Field of Classification Search ............ 358/1.9, 358/3.06, 3.11, 3.12, 3.13, 3.14, 3.21; 345/419, 345/664

See application file for complete search history.

(56) References Cited

U.S. PATENT DOCUMENTS 4,447,833 A 5/1984 Sano et al.
(Continued)

FOREIGN PATENT DOCUMENTS

EP 0 741 486 A1 11/1996
EP 02 10 2715 8/2003

*Primary Examiner*—King Y Poon
*Assistant Examiner*—Richard Z Zhu
(74) *Attorney, Agent, or Firm*—Keating & Bennett, LLP

(57) ABSTRACT

A method and apparatus for creating a print file for printing a 3-D print using a 3-D printing system is described, the 3-D print comprising a plurality of 3-D structures printed on a substrate, each 3-D print structure having a height with respect to the substrate. A two-dimensional source image is input comprising a plurality of image pixel areas. A filtered image is obtained by applying a topographic operator to the source image to generate for every image pixel a representation of a pixel height profile, the pixel height profile corresponding to cross-sections through a 3-D print structure which is to be formed by 3-D printing. Thereby definitions of a plurality of image layers are generated from the filtered image for printing using the 3-D printing system. The print file is output based on the plurality of image layers.

The topographic operator has the following property:
any cross-section through a solid section of a 3-D structure at a second level in the 3-D print structure which is closer to the substrate than a first level has an area which is equal to or larger than the area of the cross-section of the 3-D structure at the first level.

16 Claims, 15 Drawing Sheets

U.S. PATENT DOCUMENTS

| | | |
|---|---|---|
| 4,504,354 A | 3/1985 | George et al. |
| 5,149,548 A * | 9/1992 | Yamane et al. ............ 425/174.4 |
| 5,198,159 A * | 3/1993 | Nakamura et al. .......... 264/401 |
| 5,329,381 A * | 7/1994 | Payne ........................ 358/3.29 |
| 5,398,193 A * | 3/1995 | deAngelis ................... 700/119 |
| 5,869,170 A * | 2/1999 | Cima et al. .............. 428/304.4 |
| 6,007,318 A * | 12/1999 | Russell et al. ............... 425/130 |
| 6,169,605 B1 * | 1/2001 | Penn et al. ................... 358/1.1 |
| 6,172,770 B1 * | 1/2001 | Inoue ........................ 358/3.06 |
| 6,180,325 B1 | 1/2001 | Gelbart |
| 6,214,276 B1 | 4/2001 | Gelbart |
| 6,259,962 B1 * | 7/2001 | Gothait ....................... 700/119 |
| 6,357,855 B1 * | 3/2002 | Kerekes et al. ................ 347/40 |
| 6,401,001 B1 * | 6/2002 | Jang et al. ................... 700/118 |
| 6,746,814 B2 * | 6/2004 | Coe ........................... 430/269 |
| 6,813,594 B2 * | 11/2004 | Guertin et al. ................. 703/6 |
| 6,850,334 B1 * | 2/2005 | Gothait ....................... 358/1.1 |
| 6,947,178 B2 * | 9/2005 | Kuo et al. .................. 358/3.08 |
| 6,989,115 B2 * | 1/2006 | Russell et al. ................ 264/39 |
| 7,153,135 B1 * | 12/2006 | Thomas ..................... 433/213 |
| 2002/0100691 A1 | 8/2002 | Bonivert et al. |

\* cited by examiner

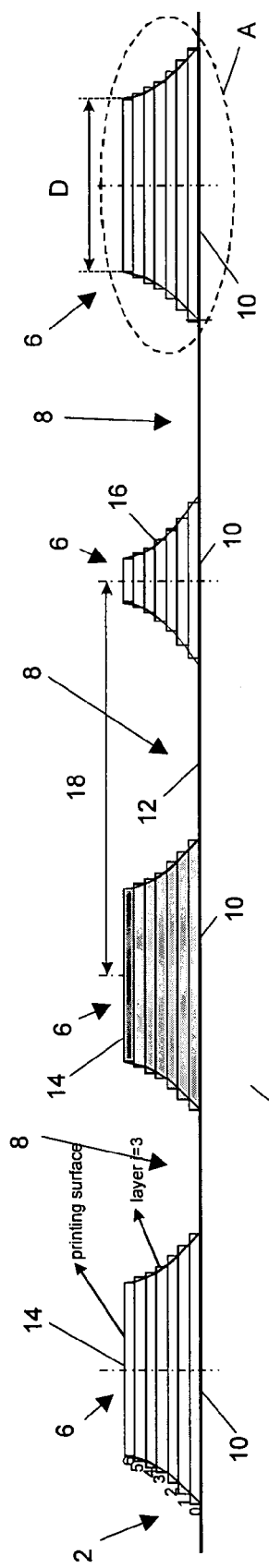
Fig. 1a
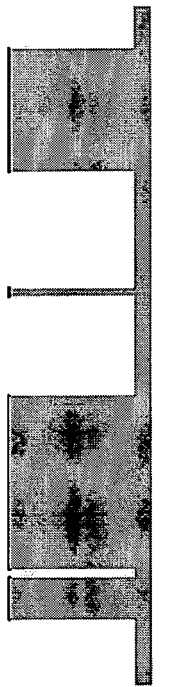
Fig. 1b

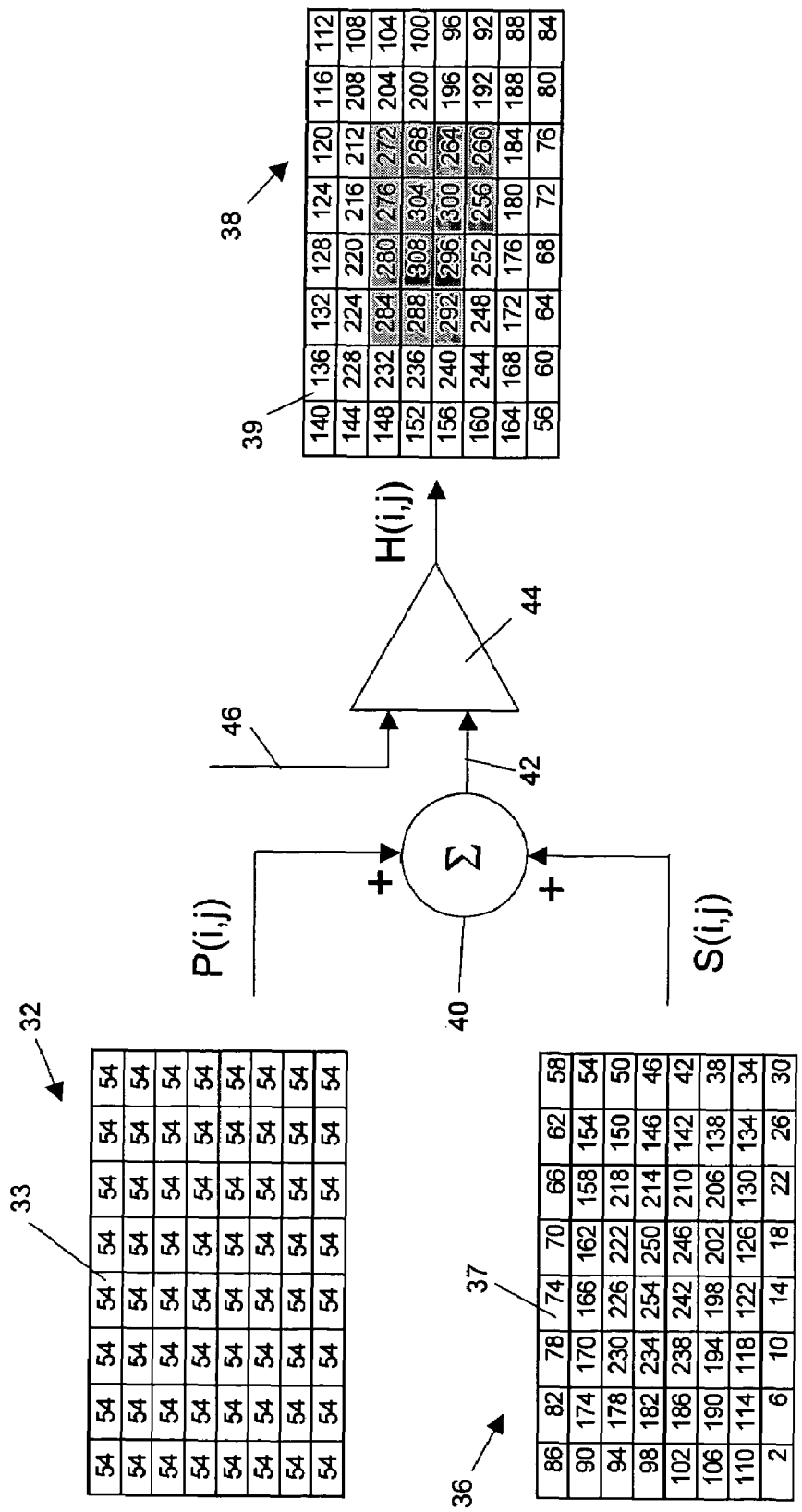
Fig. 4 - PRIOR ART

| layer $L_i$ | layer $L_{i+1}$ | stacking constraint: layer $L_{i+1}$ on top of layer $L_i$ |

$$A_{i+1} = \Pi * D^2_{i+1} / 4$$
$$A_i = \Pi * D^2_i / 4$$
$$\Delta A = A_{i+1} - A_i$$

METHOD AND APPARATUS FOR CREATING 3D-PRINTS AND A 3-D PRINTING SYSTEM

The application claims the benefit of U.S. Provisional Application No. 60/436,824 filed Dec. 27, 2002.

TECHNICAL FIELD OF THE INVENTION

The present invention relates to methods for creating 3-D prints especially 3-D print masters by use of a 3-dimensional printing system in which an image is printed in a plurality of image layers, and to corresponding apparatus which may be used for a wide variety of applications, for example for the manufacture of printing masters, such as stamps, flexographic printing masters, letterpress printing masters or gravure printing masters.

BACKGROUND OF THE INVENTION

So-called "3-D printing" is a method of creating three-dimensional objects by depositing or forming thin layers of material in succession so as to build up the desired 3-D structure. It is sometimes called Rapid Prototyping and Manufacturing (RP&M). The process has some similarities to normal printing in that a digital representation of an object to be formed is used and each layer is formed as if it were one layer of printing, e.g. by moving some kind of printing head over a workpiece and activating elements of the printing head to create the "printing". Various methods have been devised to create the thin layers. One technique makes use of a bath of polymerisable liquid material. A thin upper layer of the liquid is cross-linked or hardened in some way, e.g. via laser light, in a pattern which is the same as a cross-section through the object to be formed. The laser spot is moved across the surface in accordance with a digital representation of the relevant cross-section. After one layer is completed the liquid level is raised over a small distance and the process repeated. Each polymerised layer should be sufficiently form stable to support the next layer.

In another technique powder is dusted onto a substrate and the powder coalesced by some means, e.g. by heating or by the use of a liquid hardener, in accordance with the shape of the cross-section of the object to be formed. In yet another method, cross-linkable or hardenable material is deposited in the form of drops which are deposited in a pattern according to the relevant cross-section of the object to be formed. Still another method involves dispensing drops of molten material at an elevated temperature which then solidify on contact with the cooler work piece.

There are many items which can be produced by 3-D printing. Due to the fact that the materials used to form the object are subject to many limitations and are generally polymeric in nature, the final product is not very strong. Thus, 3-D printing is often used in prototyping, for example, to create a product design which can be handled or even tested for certain properties.

Printing plates are generally not made by 3-D printing techniques but usually by etching methods. Such plates are used in a variety of printing methods, such as flexographic printing, letterpress, offset or gravure printing. A simple form of a printing plate is the conventional rubber stamp.

Flexographic printing or flexography is a printing process where rubber mats or photopolymer plates and fast-drying fluid inks are used. Flexographic printing plates have the printing image in relief, which means that the image area is raised relative to the non-image area. The result is a relief plate that is capable of transferring ink from an anilox roll to a substrate. Almost any material that can run through a web press can be printed in this way, including hard-surfaced material such as acetate and other plastic films. Flexography has also been known as "aniline" printing.

Letterpress is a printing process where the image is raised as well and inked to produce an impression.

Offset printing is a method of printing in which the image is not printed directly from a plate, but is offset onto a cylinder which performs the actual printing operation. The printing plate generally has image-selective and hydrophobic regions on a hydrophilic background.

Gravure printing is a printing process where the image is etched into a plate or cylinder in the form of recesses or wells. These recesses or wells are filled with ink and the remaining surface is wiped clean, thus leaving the ink only in the recesses or wells. The image can then be printed off e.g. onto an absorbent material such as paper.

There are several additional methods of transferring an image from the printing plate onto the printing medium. For instance in tampon printing, a plate comprising an image in relief (or a negative image as in gravure printing) is inked. Afterwards, ink is transferred to a soft tampon printing head by contacting the tampon surface with the inked image. The tampon is then used to print another object, e.g. an object with an irregular surface.

In all the above printing methods, 3-dimensional printing plates are used which comprise a substrate with raised parts and recesses. In some of the printing industries, such as flexographic printing and letterpress, the raised parts are used for forming the image, while in gravure printing, the recesses form the image. In tampon printing either can be used.

The smallest individual raised portion on a flexographic printing plate relates to an isolated single pixel of an image. As the resolution of the image increases, the size of a pixel becomes smaller. Assuming that small parts of the image result in 3-D structures on the printing plate having a certain height L and a certain diameter d, one form of damage to the printing plate is Euler buckling. Euler buckling is buckling of thin column into a bow-like or wave-like shape. The critical load which can be applied before buckling is initiated varies approximately as $$P_{cr} = \frac{\pi^2 EI}{L^2} \tag{1}$$

wherein E is Young's modulus and I is the moment of inertia. For a quadratic cross-section the value of I is proportional to the cube of the thickness—hence the danger of mechanical failure increases as a fast function of the reduction in thickness of a protrusion. Hence, problems with small parts of the image grow rapidly as the resolution increases. Confirmation of this fact can be found in that it has been known in the flexographic printing industry that small dots on flexographic printing plates (i.e. small protruding parts) tend to break off or wear easily, with image artefacts as a consequence such as discontinuities in tone gradation (near white and near black) of the printed material.

Gravure rolls are manufactured by an expensive and time consuming etching process or by means of a diamond stylus which embosses the gravure roll. Gravure printing is popular for high quality large runs, e.g. monthly journals, where the expense of the printing rolls is outweighed by the low cost per printed page and the high volumes, and where everything is planned in beforehand. However, there is an interest in making gravure plates of reasonable quality which could be used for shorter runs or for other applications, e.g. the printing of adhesives.

SUMMARY OF THE INVENTION

It is an object of the present invention to provide an improved method and apparatus for creating 3-D print files especially a print file for a print master for use in a 3-dimensional printing system.

It is an object of the present invention to provide a method for creating 3-D prints especially print masters using a 3-dimensional printing system.

The present invention provides a method for creating a print file for printing a 3-D print using a 3-D printing system, the 3-D print comprising a plurality of 3-D structures printed on a substrate, each 3-D print structure having a height with respect to the substrate. The method comprises providing a two-dimensional source image comprising a plurality of image pixels and generating a filtered image by applying a topographic operator to the source image to generate for every image pixel a representation of a pixel height profile. The pixel height profile corresponds to cross-sections through a 3-D print structure which is to be formed by 3-D printing. Thereby definitions of a plurality of image layers from the filtered image are generated for printing using the 3-D printing system. The topographic operator has the following property: any cross-section through a solid section of a 3-D structure at a second level in the 3-D print structure which is closer to the substrate than a first level has an area which is equal to or larger than the area of the cross-section of the 3-D structure at the first level. Finally, the print file is output based on the plurality of image layers. The advantage of using one or more topographic operators to generate the print file is that manual intervention can be reduced to a minimum allowing a stream-lined and efficient generation of print files. The 3-D print may be a print master and the 3-D structures may represent areas to be printed using the print master. The topographic operator may have the following additional property: the heights of all 3-D structures in the pixel height profile which will form a printing contact surface all lie substantially within one surface with reference to the substrate. The application of the topographic operator is preferably done by means of a computing device including a processing engine and memory. The source image may be a binary image comprising pixels having a first value and remaining pixels having a second value. Where the source image is a binary image, the application of a topographic operator may include: replacing every pixel from the source file by a pixel profile spread out over neighbouring image pixels, the pixel profile corresponding to pixel heights, taking an envelope of the pixel profiles spread from neighbouring image pixels, slicing the envelope to form image layers for printing in the 3-D printing system. Alternatively, the application of the topographic operator includes: detecting the edge of a pixel area having the first value with a pixel area having the second value, and generating grey scale pixel values for pixel areas adjacent to the border and having the second value, and assigning these grey scale values to these pixel areas.

The source image may comprise a plurality of image pixels each having a contone value, and the application of the topographic operator may include: providing a digital halftone screen comprising a plurality of screen pixels, each having a multi-tone value, every screen pixel corresponding to an image pixel, providing a set of correction values which are a function of the image layer, thresholding the contone values of the source image with a combination of the multi-tone values of the halftone screen and with the correction values, to generate halftone dots. The halftone dots for the plurality of image layers may be generated on-the-fly.

The application of the topographic operator may include: generating binary halftone dots from the source image, thereafter transforming the binary halftone dots into blurred halftone dots having a height profile in the form of a plurality of blurred halftone dot layers, thereafter choosing a blurred halftone dot layer to be printed as an image layer.

Alternatively, the application of the topographic operator may include: generating binary halftone dots from the source image, thereafter associating a eight profile with the binary halftone dots and deriving a plurality of halftone dot layers from the height profiles, thereafter choosing a halftone dot layer of the binary halftone dots and transforming the halftone dot layer into a blurred halftone dot layer to be printed as an image layer. The transformation may comprise applying a smoothing algorithm or a blurring filter. The image layers are usually to be printed onto a printing substrate and the transforming step may be a function of the height of the image layer above the printing substrate.

In the method, halftoning may be based on one of amplitude modulation, frequency modulation, a combination of amplitude and frequency modulation or stochastic modulation.

As a part of the application of a topographic operator, for each pixel area under consideration, the generation of the height profile of neighbouring pixel areas may provide one or more height values at the pixel area under consideration, and the height value assigned to the pixel under consideration is determined by the largest height value provided by any one of the pixel areas including the pixel area under consideration.

In addition to application of a topographic operator, a morphological operator may be applied either before the application of the topographic operator, at the same time or at a later time. For example, the application of the morphological operator may be a pre-compensation for subsequent deformation of a dot to be printed.

The print file generated by the above methods may be used to generate a 3-D print on a substrate using a 3-D printer.

The invention also provides an apparatus for creating a print file for printing a 3-D print using a 3-D printing system, the 3-D print comprising a plurality of 3-D structures printed on a substrate, each 3-D print structure having a height with respect to the substrate. The apparatus comprises: first input means for receiving a two-dimensional source image comprising a plurality of image pixels, means for generating a filtered image by applying a topographic operator to the source image to generate for every image pixel a representation of a pixel height profile, the pixel height profile corresponding to cross-sections through a 3-D print structure which is to be formed by 3-D printing. Thereby definitions of a plurality of image layers are generated from he filtered image for printing using the 3-D printing system. The topographic operator has the following property: any cross-section through a solid section of a 3-D structure at a second level in the 3-D print structure which is closer to the substrate than a first level has an area which is equal to or larger than the area of the cross-section of the 3-D structure at the first level. Means for outputting the print file based on the plurality of image layers are provided. The 3-D print can be a print master and each 3-D print structure then represents an area to be printed using the print master. The topographic operator may then have the following additional property: the heights of all 3-D structures in the pixel height profile which will form a printing contact surface all lie substantially within one surface with reference to the substrate.

The source image may be a binary source image, and the apparatus may further comprise: spreading means for replacing every image pixel by a pixel profile spread out over neighbouring image pixels, the pixel profile corresponding to pixel heights; enveloping means for taking an envelope of the pixel profiles spread from neighbouring image pixels; and slicing means for slicing the envelope to form image layers for printing in the 3-D printing system.

The apparatus may comprise means for obtaining a binary image from the source image, the binary image comprising pixels having a first value and remaining pixels having a second value, means for detecting an edge of a pixel area having the first value with a pixel area having the second value, and means for generating grey scale pixel values for pixels adjacent to the border and having the second value and for assigning these grey scale values to these pixel areas.

The first input means may be for receiving a digital source image comprising a plurality of image pixels each having a contone value, and the apparatus may comprise in addition: second input means for receiving a digital halftone screen comprising a plurality of screen pixels, each having a multi-tone value, every screen pixel corresponding to an image pixel; third input means for receiving a set of correction values which are a function of the image layer; thresholding means for thresholding the contone values of the source image with the multi-tone values of the halftone screen and with the correction values, to generate halftone dots. The thresholding means may comprise a comparator, for example.

The apparatus may comprise: means for obtaining binary halftone dots from the source image, means for transforming the binary halftone dots into blurred halftone dots having a height profile in the form of a plurality of blurred halftone dot layers, and means for choosing a blurred halftone dot layer to be printed as an image layer.

Alternatively, the apparatus may comprise: means for obtaining binary halftone dots from the source image, means for associating a height profile with the binary halftone dots, means for deriving a plurality of halftone dot layers from the height profiles, means for choosing a halftone dot layer of the binary halftone dots, and means for transforming the halftone dot layer into a blurred halftone dot layer to be printed as an image layer.

For each pixel under consideration the generation of the height profile of neighbouring pixels may provide one or more height values at the pixel under consideration, and the apparatus may comprise: means for assigning the largest height value provided by any one of the pixels including the pixel under consideration to the pixel under consideration.

The apparatus may comprise means for application of a morphological operator either before the application of the topographic operator, at the same time or at a later time.

The present invention also provides a computer program product for executing any of the methods of the present invention when executed on a computing device associated with a 3-D printing system. The present invention also includes a machine readable data storage device storing the computer program product.

The present invention also includes a control unit for use with a 3-D printing system for printing a 3-D print in a plurality of layers, the control unit being adapted for controlling generation of the 3-D print from a source image comprising a plurality of image pixels, the control unit comprising: means for generating a filtered image by applying a topographic operator to the source image to generate for every image pixel a representation of a pixel height profile, the pixel height profile corresponding to a cross-section through a 3-D print structure which is to be formed on the 3-D print by 3-D printing, the topographic operator having the following properties: any cross-section through a solid section at a second level in the 3-D print structure which is closer to the substrate than a first level has a larger area than the area of the cross-section of the 3-D structure at the first level, and means for generating a plurality of image layers from the filtered image for printing the 3-D structures using the 3-D printing system. The 3-D print may be a print master and the topographic operator then has the additional property that heights of all 3-D structures in the pixel height profile which will form a printing surface all lie substantially within one surface with reference to the substrate.

The present invention can be used to make print masters comprising conventional halftones, frequency modulation halftones or amplitude modulation halftones, combinations of frequency modulated and amplitude modulated halftones, stochastic halftones and/or solid text. The present invention can also be used to apply spread and choke. "Spread" means that lighter areas are spread into darker areas (e.g. if a yellow T is to be printed on a black background, a spread is applied on the T), and "choke" means that a lighter background colour encroaches into the enclosed colour (e.g. if a black T is to be printed on a yellow background, a choke is applied to the background where the T has to be printed). In order to obtain this, a special filter is applied to each image pixel, such that a border line of pixels is added in next to each cluster of pixels.

These and other features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 1a is a diagrammatic cross-sectional view of a part of a flexographic printing master according to the present invention.

FIG. 1b shows selection of a topographic operator as a function of image content in accordance with an embodiment of the present invention.

FIG. 2 is an enlarged view of the protruding part indicated as A in FIG. 1a.

FIG. 4 is a diagrammatic overview of a digital halftoning method according to the prior art.

Figure 2:
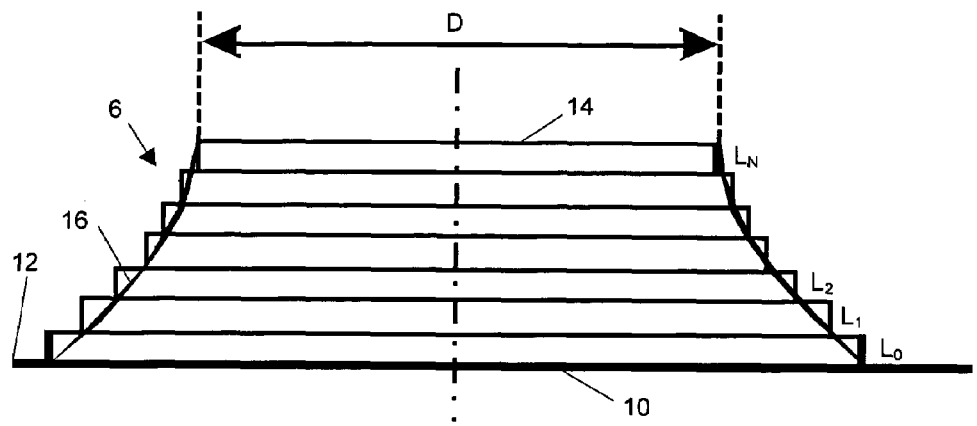

In the different figures, the same reference figures refer to the same or analogous elements.

DESCRIPTION OF ILLUSTRATIVE EMBODIMENTS

The present invention will be described with respect to particular embodiments and with reference to certain drawings without being limited thereto. The drawings described are only schematic and are non-limiting. The present invention will mainly be described with reference to print masters but the invention is not limited only to forming print masters and may find general application to printing 3-D prints within the scope of the attached claims. For instance, although the invention is described with reference to certain types of print masters, it may be applied advantageously to any form of image transferring element, e.g. equally well to a rubber stamp as to a gravure or flexographic printing master.

The term "printing" as used in this invention should be construed broadly. It relates to forming markings whether by ink or other materials or methods onto a printing substrate or medium. The term "printing" in accordance with the present invention not only includes marking with conventional staining inks but also the formation of printed structures or areas of different characteristics on a substrate, e.g. the printing of adhesives or fluorescent inks or soldering masks. The term "printing medium" or "printing substrate" should also be given a wide meaning including not only paper, transparent sheets, textiles but also flat plates or curved plates. In addition the printing may be carried out at room temperature or at elevated temperature, e.g. to print a hot-melt adhesive the printing head may be heated above the melting temperature. Accordingly, the term "ink" should also be interpreted broadly including not only conventional inks but also solid materials such as polymers which may be printed in solution or by lowering their viscosity at high temperatures or inorganic materials such as metals which may be printed in dispersion, as well as materials which provide some characteristic to a printed substrate such as a structure on the surface of the printing substrate or water repellence, as well as adhesives or binding molecules such as DNA which are spotted onto micro-arrays. As "ink carrier" both water and organic solvents may be used. Inks as used with the present invention may include a variety of additives such as anti-oxidants, pigments, cross-linking agents, wetting agents and surface tension agents. The term "image" should also be interpreted broadly and includes any form of pattern whether this forms a recognisable picture or not or just a regular array of dots, e.g. of adhesive. 3-D printing may be described as forming an object from a material which is or can be rendered flowable and is dispensed. The material solidifies in layers or laminae or is otherwise physically transformed into such. The material becomes form stable to thereby form an object on a layer-by-layer basis. In particular, a material which is flowable or can be rendered flowable is deposited in a pattern to form a thin slice of a cross-section of the object to be formed, a process sometimes called selective deposition modelling or manufacturing. The successive layers of the material solidify or otherwise physically transform into form stable material upon or after being dispensed thereby forming layers of the object, each layer representing a cross-section of that object. The term "layer" is sometimes referred to as a lamina or a cross-section, and these terms are considered to be all equivalent to each other. The dispensing of the material will normally be done under the control of a computing device, such as a computer, especially a personal computer, a microcontroller or similar.

The present invention is based on the concept of representing the 3-D shape of a printing master as a topographic map, that is that height contours of the 3D shape of a printing master are represented in a map or 2-D spatial pattern, e.g. by variations in grey scale values. A topographic map is basically a 2-D spatial pattern in which height information is coded by means of a multi-value property of each pixel of the map, e.g. a grey scale value. From this representation, a print file for a 3-D printer may be derived. The topographic map is generated from the 2-D spatial information found in or derived from the original input image. The input can be one of several types of image, especially a binary image, i.e. an image which is formed of areas having a first binary value and other areas having a second binary value. This input image has been digitised, i.e. it is represented as an array of discrete image elements which may be called "pixels". In the present invention the word pixel or pixel area is used as a reference to an element, preferably an atomic element of an image in its broadest sense. The binary image may be obtained by any suitable means, e.g. it may be recovered from a file, it may be generated from a contone image or a hybrid of a contone and a text or line art image by application of a halftoning technique, it may be a text or line art file, or it may be generated de novo and directly via a suitable algorithm, e.g. a fractal function which generates a specific pattern when executed.

A topographical operator is then applied to the 2-D spatial binary image to form a topographic representation of that image, i.e. an image which includes data which may be interpreted as a 3-D shape, e.g. of a printing master. The topographic operator is applied to the 2D spatial information to create a representation which can be used to print a print master, i.e. the representation after application of the topographic operator contains information which relates to the third dimension of height. This topographic operator processing may be summarised as follows.

A p×q binary image may be represented by the matrix $P_{pq}$:

$$P_{pq} = \begin{bmatrix} P_{11}^{\{0,1\}} & . & . & . \\ . & P_{ij}^{\{0,1\}} & . & . \\ . & . & . & . \\ . & . & . & P_{pq}^{\{0,1\}} \end{bmatrix} \quad (2)$$

where $P_{ij}^{\{0,1\}}$ represents the value of the $ij^{th}$ image element or pixel of an p×q array of pixels, whereby the values may be selected from a membership function containing only two possible (hence binary) values (represented here for clarity's sake by 1 or 0, but they could be any two values of any kinds of symbols). After the application of a topographic operator in accordance with the present invention this matrix is transformed into:

$$T_{nm} = \begin{bmatrix} T_{11}^{\{0 \ldots s\}} & . & . & . \\ . & T_{ij}^{\{0 \ldots s\}} & . & . \\ . & . & . & . \\ . & . & . & T_{nm}^{\{0 \ldots s\}} \end{bmatrix} \quad (3)$$

where $T_{ij}^{\{0 \ldots s\}}$ represents the value assigned to the $ij^{th}$ matrix element of an n×m matrix of pixels, this value being selected from a membership function which includes more than two values, i.e. values $\{0 \ldots s\}$. The spacing of the members of the set $\{0 \ldots s\}$ need not be uniform. The matrix size (i.e. the resolution of the transformed image) does not have to be the same as the p×q input image, e.g. the resolution could be the same or could be less or higher to adapt to a specific capability of the 3D-printing system to be used to make the printing master. Again, the use of 0 and s as descriptors of these multiple values is only for convenience's sake—they could be any values, e.g. any symbols such as characters, numbers, letters, etc. Then, a height value is assigned to each of the values $\{0 \ldots s\}$, this height value being such that the value of $\{0 \ldots s\}$ assigned to a matrix element T is a representation of the height of the corresponding image element in a topographic map which is to represent the printing master. This height is for example representative of the height above a substrate of a pixel printing 3-D structure of a printing master. There are two restrictions on the topographic operator which transforms the matrix P into the matrix T:

a) The heights of the matrix elements $T_{ij}$ which correspond to the picture elements $P_{ij}$ which have one of the binary values in the original binary image matrix P, must all be coordinated such that a printing surface is generated which is formed by all picture elements $P_{ij}$ having this first value. For example, assuming the printing master is to be formed by 3-D printing onto a substrate, all the heights of picture elements $P_{ij}$ having one of the binary values (e.g. "1") can have substantially the same height above the substrate after 3-D printing of the plate. This substantially equal height restriction is required to form a printing master which will print uniformly without leaving gaps. The pixel elements $P_{ij}$ having the other value will generally have values which differ from each other. Note that substantially equal height is not necessary to fulfil the requirement that good printing is obtained—the printing master could slope uniformly in one direction, for example. What is important is that all the printing parts of the master that at a given time instance on the press make contact with the medium to be printed lie on a single surface, e.g. a plane. Making all printing parts with the same height above the substrate is one embodiment which fulfils this requirement.

b) Any cross-section through solid protrusions of the printing master at a second level in the 3-D print structure which is closer to the substrate than a first level has an area equal to or larger than the area of the cross-section of the 3-D structure at the first level. This guarantees that any protrusion is adequately supported and there are no overhangs.

In addition to the above restriction, an optional restriction is that areas at the uppermost positions of the 3-D print structures of the printing master which will be used for printing are substantially equal to the areas of corresponding pixels of the binary source image. In the case of flexo-printing, it is the areas of the printing master which are at the top of the protrusions which will be used for printing and which should be substantially the same area as the areas having one of the binary values in the binary image. On the other hand, in the case of certain types of gravure printing it is the volume of a printing well which determines the level of the printed grey scale and not a printing area. In this case, a pixel area of the binary image does not map to an area of printing surface in the printing master, instead it maps to the volume of the topographic map representation which represents the corresponding ink well. Thus, the topographic operator which is used for making a gravure printing master is fundamentally different from a printing master for flexographic printing but both are included within the scope of the present invention.

There are, however, several other situations when this restriction on maintaining pixel area is not applied exactly:

Where there is dot spread which has to be allowed for in the printing process the area of the printing surface in the printing master may be different, e.g. smaller than the pixel area in the binary image. Note that this problem can be compensated either in the way binary image is constructed or in the way the 3-D printing file for the printing master is derived from the binary image.

Where the printing master is made flat and then applied to a drum the actual printing areas of the printing master must be made smaller in the circumferential direction so that they achieve the correct size after the distortion caused by application to the drum.

In the case of image spread and choke the printing areas on the printing master are made deliberately larger or smaller, respectively. For example this can be done for certain colour separations in order to improve the boundaries between light and dark colours.

The above three cases may be generalised in that they all change the shape or morphology of the pixels. Thus they all involve the application of one or more morphological operators. Thus the present invention includes both application of a topographical operator and application of a morphological operator. These may be applied in one step, i.e. it is possible to combine the topographic and morphological operators into one filtering function so that a morphological and a topographic operator are applied at the same time, or even to apply the morphological operator before the topographical operator as a pre-processing step.

The above may be generalised to the case in which the input image may be a full colour grey scale image (which includes a binary image or a combination of binary and contone images) which may be represented by:

$$P_{pq} = \begin{bmatrix} P_{11}^{\{0 \ldots t\}} & . & . & . \\ . & P_{ij}^{\{0 \ldots t\}} & . & . \\ . & . & . & . \\ . & . & . & P_{pq}^{\{0 \ldots t\}} \end{bmatrix} \quad (4)$$

where $P_{ij}^{\{0 \ldots t\}}$ represents the a black/white or full colour grey scale value of the $ij^{th}$ image element or pixel of a p×q matrix, whereby the value for each pixel may be selected from a membership function containing values $\{0 \ldots t\}$. For example, each pixel may be defined by a 16 bit or 8 bit colour reference. Again, the use of 0 and t as descriptors of these multiple values is only for convenience's sake—they could be any values, e.g. any symbols such as characters, numbers, letters, etc. Such an image may be a contone image. In general the input image according to the present invention is a 2-D spatial distribution or pattern which can be printed. Examples of such images are not only text, photographs, graphics artwork but also graphs, arrangements of symbols, different texturing areas in a 2-D form or arrangements of adhesive areas to be printed on to a printed circuit board. At each location within the pattern, one or more scalar quantities define local values, e.g. colours and/or luminosity. The topographic operator in accordance with the present invention operates on one or more of the scalar values to generate a representation which can be use to create a 3-D print. The height information generated by the topographic operator is different from any explicit or implicit height information contained in the input image. The input image of the present invention should be distinguished from a 3-D image which is ready to be printed by a 3-D printer. For example, it is possible to make a 3-D scan of a flexographic printing plate and to print this 3-D image. The spatial 2-D input image of the present invention does not contain explicit information in the third spatial dimension required to print the corresponding printing plate. This type of 3-D image is first created in accordance with the present invention after application of a topographic operator to convert the "flat" 2-D image into a contoured relief image. The topographic operator is applied to the 2D spatial information to create a representation which can be used to print a 3-D print such as a print master, i.e. the representation after application of the topographic operator contains information which relates to the third dimension of height. Also, although an image can contain implicit height information not related to how it is to be printed (e.g. it is a 3D perspective scale drawing) one of the topographic operators according to the present invention generates height information related to a print master, that is not related to height information implicitly contained in the input image.

Hence, after the application of such a topographic operator this matrix 4 ($P_{pq}$) is transformed into at least one matrix of the form:

$$T_{nm} = \begin{bmatrix} T_{11}^{\{0 \ldots s\}} & . & . & . \\ . & T_{ij}^{\{0 \ldots s\}} & . & . \\ . & . & . & . \\ . & . & . & T_{nm}^{\{0 \ldots s\}} \end{bmatrix} \quad (5)$$

where $T_{ij}^{\{0 \ldots s\}}$ represents the value assigned to the $ij^{th}$ matrix element of a n×m matrix, this value being selected from a membership function which includes the values $\{0 \ldots s\}$. The spacing of the members of the set $\{0 \ldots s\}$ need not be uniform. The numbers n and m need not the same as p and q of the input image. The number of values in the membership function $\{0 \ldots s\}$ is not usually the same as the number in the membership function $\{0 \ldots t\}$. Then, a height value is assigned to each of the values $\{0 \ldots s\}$, this height value being such that the value of $\{0 \ldots s\}$ assigned to a matrix element T is a representation of the height of the corresponding image element in a topographic map which is to represent a 3-D structure of the printing master. Thus the filtering operation using the topographic operator may be applied to a contone input image or similar image or to a binary image. For example, the binary image may first be formed from the contone image and the topographic operator may be applied to the binary image in order to create the topographic map from which the print file for a 3-D printing system is derived. As previously described, the application of a morphological operator may be done simultaneously or sequentially with respect to the application of the topographic operator.

Generally, a matrix $T_{nm}$ will be generated for each colour separation, e.g. three for CMY printing, four for CMYK printing or any other number in the case of spot color printing, and each such colour separation transform matrix will be used to create one master of a set of printing masters. Each colour separation is treated separately in order to create a plurality of printing masters, e.g. three masters for CMY printing, four masters for CMYK printing or any other number in the case of spot color printing.

The transform matrix $T_{nm}$ defines a topographic map whereby areas of equal height above the substrate onto which the printing master profile will be printed are defined by each pixel of that area having a value of one member of $\{0 \ldots s\}$ or a member at a higher level. Thus areas defined by pixels which have a value of $\{0 \ldots s\}$ equal to or above a certain member of this set define a level or slice through the three-dimensional structure to be printed, in a similar way to contours do on a 3D-relief of a geographic map. This height coding is implicit in the image, i.e. a 2-D spatial matrix $T_{nm}$ is coded for height rather than being a true 3-D matrix. Each of these levels is shown as a layer 16 in FIG. 1a. Each such a layer of the topographic map may be derived from the $T_{nm}$ matrix:

$$^{c1}T_{nm} = \begin{bmatrix} c1\,T_{11}^{s \geq h\{0,1\}} & . & . & . \\ . & c1\,T_{ij}^{s \geq h\{0,1\}} & . & . \\ . & . & . & . \\ . & . & . & c1\,T_{nm}^{s \geq h\{0,1\}} \end{bmatrix} \quad (6)$$

where $^{c1}T_{nm}$ is a binary matrix for one printing layer of a printing master which will be used in a printing operation to print a colour C1, in which each pixel $^{c1}T_{ij}$ has a value which is determined by having a first binary value when the value of the pixel in $T_{nm}$ is s≧a value h of the set and is otherwise the second binary value. It is to be understood that the convention applies that the greater the value of s the greater the distance from the substrate onto which the 3-D structures of the printing master are to be printed. However, other conventions are possible, e.g. that the lower the value of the s, the greater the height above the substrate in which case the relationship changes to s≦h.

Only the pixels with the first binary value are printed by the 3-D printing system for this layer. Hence, areas as defined by $^{c1}T_{nm}$ with s≧h and having the first binary value may be translated directly into printed layers on the substrate to form the printing master. Alternatively, these contour layers may be further processed to define other printing layers, e.g. by interpolation between layers defined by members of the set {0 . . . s} or by selecting less than the complete number of layers defined by the set {0 . . . s}, e.g. every other one.

The complete set of matrices which define the set of printing masters which are required for full-colour printing using a set of colours C1 to Ck may be represented by a set of T matrices one for each colour and for each value of h from h=0 to h=s:

$$\{^{C1}T_{nm}, \ldots ^{Ck}T_{nm}\} = \left\{ \begin{bmatrix} ^{c1}T_{11}^{s\geq h\{0,1\}} & . & . & . \\ . & ^{c1}T_{ij}^{s\geq h\{0,1\}} & . & . \\ . & . & . & . \\ . & . & . & ^{c1}T_{nm}^{s\geq h\{0,1\}} \end{bmatrix}_{h=0}^{h=s}, \ldots \begin{bmatrix} ^{ck}T_{11}^{s\geq h\{0,1\}} & . & . & . \\ . & ^{ck}T_{ij}^{s\geq h\{0,1\}} & . & . \\ . & . & . & . \\ . & . & . & ^{ck}T_{nm}^{s\geq h\{0,1\}} \end{bmatrix}_{h=0}^{h=s} \right\} \quad (7)$$

This set of matrices is then used to form a print file for the 3-D printing system. The layers s described by these matrices may be the same as the layers of 3-D printing which will form the print master however the present invention is not limited thereto. Additional topographic transformations may be applied to the set of matrices 7 before making print files for the 3-D printing system. A preferred embodiment of the present invention takes the topographic map described by the above matrices and slices it's 3-D representation horizontally into a plurality of layers 0 . . . v, i.e. the set of s values becomes a set of v values {0 . . . v}, whereby the number of slices, i.e. the number of members of the set {0 . . . v} is not necessarily the same as the number in the set {0 . . . s}. The spacing of the members of the set {0 . . . v} need not be uniform. Each slice then forms a layer to be printed. The most general description of the print file is given by a set of matrices one for each colour c1 . . . c$_k$, and for each value of h between zero and v is, therefore:

$$\{^{C1}T_{nm}^v, \ldots ^{Ck}T_{nm}^v\} = \left\{ \begin{bmatrix} ^{c1}T_{11}^{v\geq h\{0,1\}} & . & . & . \\ . & ^{c1}T_{ij}^{v\geq h\{0,1\}} & . & . \\ . & . & . & . \\ . & . & . & ^{c1}T_{nm}^{v\geq h\{0,1\}} \end{bmatrix}_{h=0}^{h=v}, \ldots \begin{bmatrix} ^{ck}T_{11}^{v\geq h\{0,1\}} & . & . & . \\ . & ^{ck}T_{ij}^{v\geq h\{0,1\}} & . & . \\ . & . & . & . \\ . & . & . & ^{ck}T_{nm}^{v\geq h\{0,1\}} \end{bmatrix}_{h=0}^{h=v} \right\} \quad (8)$$

There may be several reasons for the transform from 7 to 8 (or from 5 to 8) other than slicing. In another preferred embodiment of the present invention the additional topographic operator may be to change the slope of the mechanical buttressing of each pixel shown in FIG. 1a. This requires making detailed changes to the widths of each layer to be printed, whereby these changes are applied selectively depending upon the pixel size, i.e. upon source image content. Thus a small pixel may require larger supporting layers underneath it compared to a large pixel area. Such changes may need to be made depending upon the material which is to be used to make the printing master for instance. An example of this is shown graphically in FIG. 1b. In the upper drawing a binary image has been operated upon by a first topographic operator to spread each binary pixel and to create a representation which can be transformed into 3-D structures, e.g. a printing master. However, this spreading operation has certain disadvantages. Firstly, as shown on the left in the upper drawing, a near-black area (e.g. to provide 99% ink coverage when used as print master) has very small spaces between the raised portions of the printing master. These are blocked by the spreading operation. Thus an application of a topographic operator adjusts this condition as shown in the lower drawing, so that the spaces at the top of 3-D structures remain open and print correctly. Secondly, very light grey areas (e.g. 1% areas) have pixel structures which are tall and narrow as shown in the middle of the top drawing. Operation of a topographic operator may change the slope of the buttressing walls as shown in the bottom drawing to provide a better mechanical support for these tall, thin structures. Thus, the present invention includes application of a topographic operator which alters the topography of the final 3D-print based on the image content of the source image.

Further, the heights of each pixel structure in the printing plate may have to be artificially increased, e.g. if a planarizer according to U.S. Pat. No. 6,305,769 is used, the final height achieved in 3-D printing is not the same as the input height to the printer. Thus, a topographic operator may need to be applied to artificially increase the height of each pixel to be printed in order to achieve the correct height in the 3-D print after printing and planarising.

Another embodiment of a topographic operator that changes heights of pixel structures may be the case in which the height of small pixels areas is lowered compared to the height of large pixel areas because small and large pixel areas on the printing master behave differently in the nip of a flexographic press, i.e. in the contact zone between the anilox and the printing master and between de printing master and the print media. To ensure contact in said nip a pressure is exerted between the printing master and the anilox respectively the print media. Large pixel areas in the printing master are impressed locally reducing their height, while small individual pixels with narrow mechanical buttressing are prone to Euler buckling when put under pressure. This buckling effect not only induces wear of the pixel area but also influences image quality in a negative way (e.g. unpredictable printed dot size and shape for isolated pixels). One way to overcome this wear or unreliable behaviour of small pixel areas is to lower the height of these areas so as to only gently touch the anilox and the print media when the printing master is pressed against them. The amount of height that small pixel areas need to be lowered on the printing master with respect to the default height of the 3-D printing master structures can be calculated from the overall contact area between printing master and for example the anilox in the nip, the pressure between both, the shape of the mechanical buttressing and physical characteristics (e.g. strain) of the material or materials used to build the 3-D structures on the printing master. The topographic operator required to do this kind of transformation is applied selectively depending upon the pixel size and upon the relief area of the printing master (i.e. image content) in the nip of the flexographic press. This embodiment shows that the present invention also includes application of a topographic operator which alters the topography of the final 3D-print based on 3-D printer and/or printed material properties or parameters.

All such operations on an input image as defined by any of equations 5 to 7 are also application of a topographic operator in accordance with embodiments of the present invention.

As will be appreciated from the above, the input image may be an analog image, a contone image, a binary image, a combination of a binary image and contone image or an image containing implicit height information which is then, in accordance with the present invention, transformed into the set of matrices $\{^{C1}T^v_{nm}, \ldots {}^{Ck}T^v_{nm}\}$ by one or more topographic operators and optional morphological operators.

The present invention includes suitable pre-processing steps on the input image to render it suitable for transformation with a topographic operator according to the present invention. For example, when the image is an analog image, the image is first digitised and stored on a suitable data carrier or in a suitable memory. The input image may have a colour gamut which requires a coding of too many bits to be compatible with the computer system used to transform the image into the topographic map used by the present invention as an input file to the 3D-printer. In such cases the skilled person has various techniques available to carry out a colour classification to render the image with less bits/colour.

In the following a 3-D printing method will be described which can be carried out by dispensing liquid materials but the present invention is not limited thereto, but includes within its scope any suitable method of 3-D printing, e.g. by dispensing powders, meltable solids, solidifiable or hardenable liquids, etc.

As an example of a transferring element in accordance with an embodiment of the invention, a printing master 2 for flexographic printing is described, as shown in FIG. 1a. This printing master 2 comprises a printing master substrate 4 and a plurality of protruding parts 6 separated from each other by recesses or wells 8. In flexography, the protruding parts 6 are used for printing, e.g. the surfaces of the protruding parts 6 form a pattern or text and the plate 2 is used to transfer an image of the pattern or text to a suitable medium. In gravure the wells are used. In the following reference will mainly be made to flexographic printing masters but the skilled person will appreciate that the same teaching may be adapted to be applied to other forms of printing e.g. gravure.

The protruding parts 6 according to the present invention each have a bottom side 10 at a surface 12 of the substrate 4, and a top side 14 away from the substrate 4. It can be seen from FIG. 1a that in a cross-section perpendicular to the surface 12 of the substrate 4, the protruding parts 6 have a shape which is not uniform over its height. In particular they are wider at the bottom side 10 than at the top side 14.

The protruding parts 6 are made from a plurality of layers $L_0, L_1, L_2. L_N$, as can be more clearly seen from FIG. 2, whereby the top layer $L_N$ is smaller in width than the bottom layer $L_0$. The dimensions D of the top layer $L_N$ in the plane of the substrate surface 12 define the dimensions of the dot that will be printed, as the top layer $L_N$ forms the top side 14 of the protruding part 6.

The protruding parts 6 have a specific shape and may include a slope 16 between bottom layer $L_0$ and top layer $L_N$. This slope 16 may be dependent on the diameter or cross-sectional area of the top side 14 of the protruding part 6. This cannot be obtained easily with a conventional etching technique, as different slopes would require different etching techniques or different etching parameters (i.e. process settings). Thus, according to an aspect of the present invention, the shape of a vertical cross-section of a protruding part 6 may vary depending upon the size of the printing part of the raised portion. A reason for this is that the mechanical strength of small protrusions can be lower than for large protrusions, hence small protrusions need more buttressing on their sides. For example, the smaller the top layer $L_N$, the less steep the slope 16 preferably is, in order to give enough support for small protruding parts 6. Further, the slope may not be the same at all positions around the circumference of the protruding part. That is, one or more sides of the protruding part may have a less or more steep slope in order to obtain specific and useful mechanical effects, e.g. mechanical reinforcement in one or more particular directions.

According to an embodiment of the present invention, all protruding parts 6 form halftone dots on a fixed grid, i.e. with a fixed frequency and a fixed screen angle. The protruding parts have a different size to modulate the tone obtained (amplitude modulation). The screen period 18 of the grid is shown in FIG. 1.

According to another embodiment of the present invention (not represented in the drawings), the protruding parts 6 form fixed-sized halftone dots on a variable grid, i.e. the tone value obtained is changed by changing the average spacing between fixed-sized dots. This is called frequency modulation halftoning.

According to yet another embodiment of the present invention (not represented in the drawings), hybrid halftoning may be used, in which a combination of amplitude and frequency modulation is used, e.g. in certain tone ranges, the size of the dots on a fixed grid is varied, while in other tone ranges the spacing between fixed-sized dots is varied.

Figure 3:
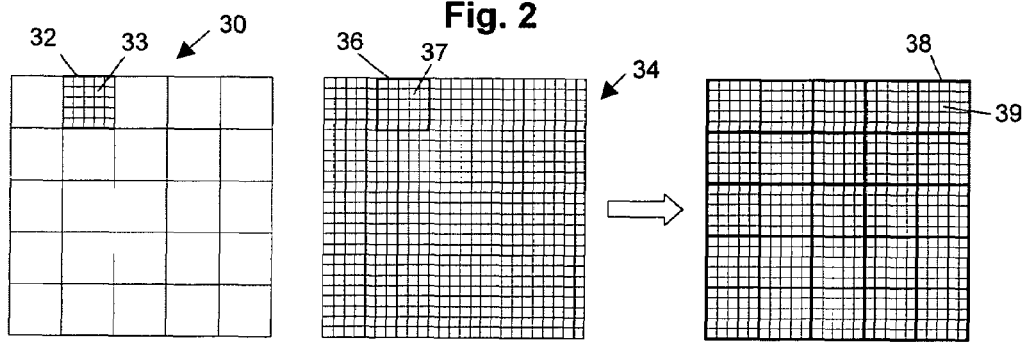
FIG. 3 illustrates the relationship between image pixels, screen pixels and halftone dots.

The halftone dots can be obtained by digital halftoning, i.e. by calculations on a computing device, which convert an image into a map of binary halftone dots. Digital image processing techniques are used to convert contone image pixels (or thus image pixels with a number of grey level values, typically 255 grey level values) into a halftone dot pattern, i.e. into a binary pattern of black dots and white areas. Conventional digital halftone dot patterns are created, as illustrated in FIG. 3, by superimposing an image grid 30 comprising image areas 32 comprising contone pixels 33 over a screen grid 34 comprising cells of screen function 36. Each cell of screen function 36 comprises a plurality of screen pixels 37 with different grey values. Each contone image area 32 can be considered to contain the same size of image pixels 33 as a screen cell 36 contains screen pixels 37, whereby in the example given in FIG. 4 all image pixels 33 of the image area 32 have the same grey value (this has been done for reasons of simplicity only, and does not need to be so). Halftone cells 38 comprising halftone pixels 39 forming halftone dots 35 are obtained by a method of thresholding. The halftone pixels 39 within a halftone cell 38 can represent the smallest marks that can be made by the printing device. Dark halftone pixels 39 clustered together in a halftone cell 38 form a halftone dot 35.

The conventional halftoning result for one halftone cell 38 is illustrated in FIG. 4. Each location (pixel) of a matrix in this FIGURE is given a number, e.g. 54, which relates to the image density at that position. The upper matrix represents an image area 32, which is a regular array of contone image pixels 33. The image area 32 represented in FIG. 4 has a constant image density for reasons of simplicity only. The lower matrix represents a screen function 36 in which the image densities of the screen pixels 37 vary over the screen function 36. Corresponding pixels in the image area 32, screen function 36 and halftone cell 38 are pixels 33, 37, 39 which occupy the same location (row number and column number) in the respective arrays. The image pixel 33 and the corresponding screen pixel 37 have the same surface area. Different screen pixels 37 have different grey levels (different values shown in the example given) defining the screen function 36. Each image pixel 33 having a certain grey level (value "54" in the example given) is superimposed onto a corresponding screen pixel 37 in a summation circuit 40, i.e. the grey value of every image pixel 33 is summed with the grey value of the corresponding screen pixel 37. The result 42 is thresholded by comparing it in a comparator 44 with a threshold value 46, for example the value "255". If the sum of the grey values of an image pixel 33 and a screen pixel 37 exceeds the threshold value 46, the corresponding halftone pixel 39 of the halftone cell 38 is black; if not, it is put white. All black halftone pixels 39 in a halftone cell 38 form a halftone dot 35. Alternatively, instead of thresholding the sum 42, grey values of the original image and grey values of the screen can be simply compared: if the grey value of the image pixel 33 is smaller than the grey value of the corresponding screen pixel 37, then the corresponding halftone pixel 39 in the halftone cell 38 is white, otherwise it is black. The result is a conversion of a contone pixel image area 32 into a halftone dot 35 which is formed in a halftone cell 38, i.e. a contone value has been converted to a digital (binary) entity which is either black or white. The digital halftone dot 35 has a total area relating to the original image density of image area 32. FIG. 4 only shows one digital halftone cell 38 having halftone pixels 39. When a plurality of such halftone cells 38 are printed one next to the other, and the pixels 39 are small enough, the human visual system fails to perceive the individual halftone dots 35 and integrates them into a perceived tint level. This tint is dependent on the percentage of the halftone cell 38 which has halftone pixels 39 which are black. It can be seen that different dot sizes are obtained for representing different contone values of image areas using amplitude modulation.

Figure 5:
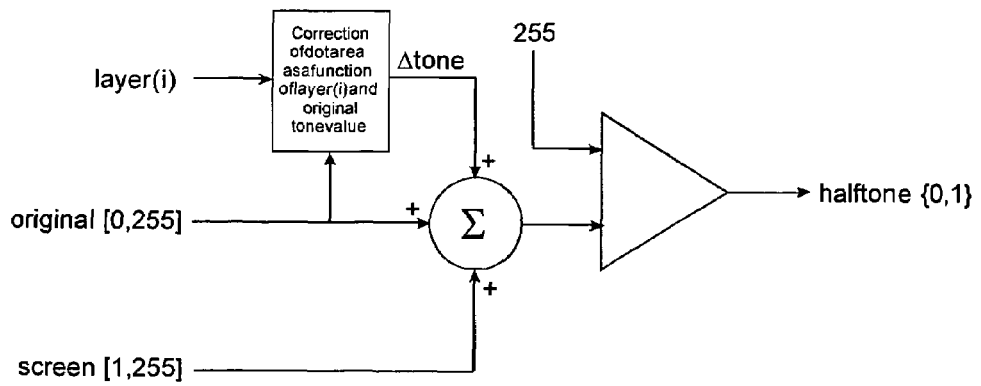
FIG. 5 is a diagrammatic overview of a first embodiment of method for creating print masters according to the present invention.
Figure 6:
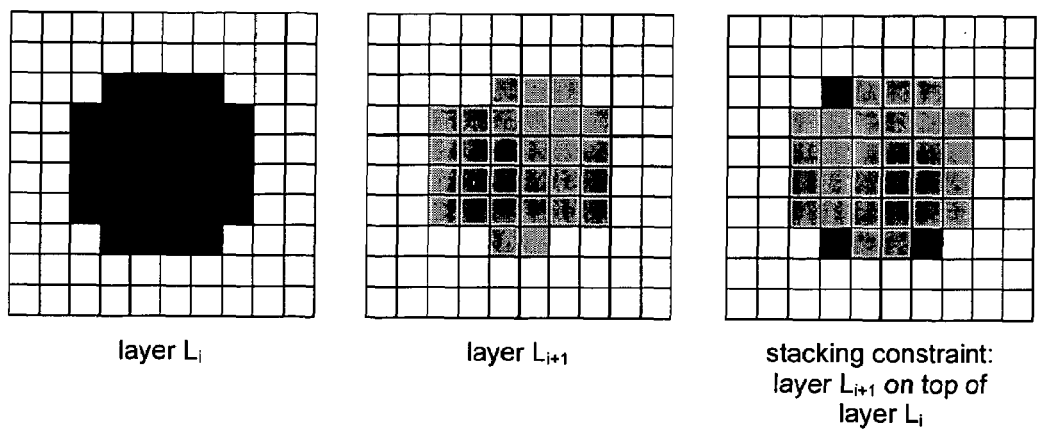
FIG. 6 illustrates the stacking constraint for subsequent layers when carrying out 3-dimensional printing according to the present invention.
Figure 7:
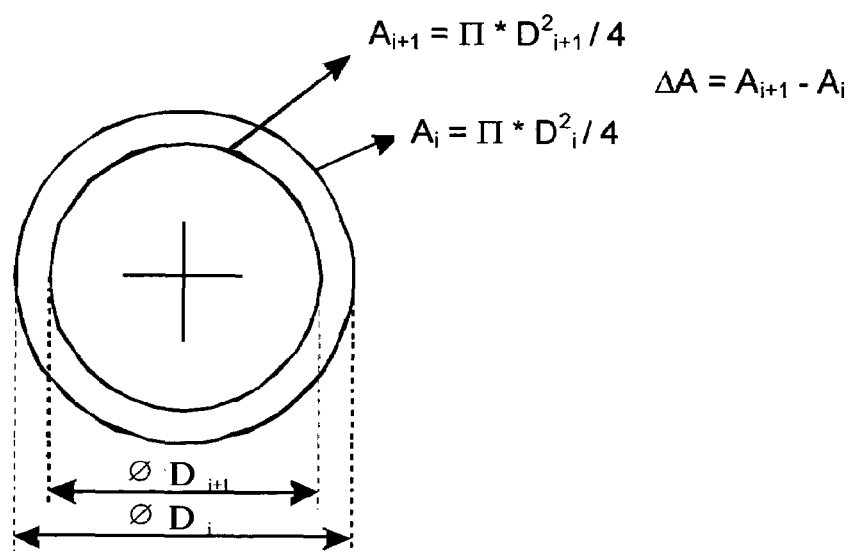
FIG. 7 illustrates the area difference between two subsequent layers of a protruding part of a printing structure according to the present invention.

In order to obtain halftone cell definitions according to an embodiment of the present invention, a sum of the densities of an original image or source image and a screen is thresholded, as schematically represented in FIG. 5. However, according to one aspect of the present invention, a correction or modification of the dot area is made as a function of the position or height of the layer (i) within the 3-D shape to be printed and the original tone value. This is needed because when producing the protruding parts 6 of the printing master 2, the final result of the 3-D printing will be a three-dimensional structure whose top surface has an area equal to the area of the halftone dot to be printed, and is located where the halftone dot needs to be printed. However, at least some of the layers $L_0, \ldots, L_{N-1}$ underneath the top layer $L_N$ will be designed to provide support and will be larger than the final halftone dot size. As each layer $L_i$ must provide a base for the next layer $L_{i+1}$, a stacking constraint has to be taken into account: layer $L_{i+1}$, has to come on top of where layer $L_i$ has been applied. Therefore, layer $L_{i+1}$ of a particular 3-D shape can never be larger than layer $L_1$ of that same 3-D shape. This is illustrated in FIG. 6 and FIG. 7. The surface area $A_i$ of layer $L_i$ is:

$$A_i = \Pi D_i^2/4 \quad (9)$$

The surface area $A_{i+1}$ of layer $L_{i+1}$, is:

$$A_{i+1} = \Pi D_{i+1}^2/4 \quad (10)$$

The difference in surface area between two subsequent layers $L_i$ and $L_{1+1}$, is:

$$\Delta A = A_{i+1} - A_i \quad (11)$$

Therefore, when applying each layer $L_0, \ldots, L_N$ of the protruding parts 6 forming a halftone dot, a correction value is taken into account, so that each layer $L_i$ is not smaller than layer $L_{i+1}$, on top of it. All layers $L_0, \ldots, L_{N-1}$ applied underneath the top layer $L_N$ have an area which is not smaller than the area of the top layer (which area corresponds to the surface of the halftone dot). The closer the layer to the substrate surface 12, the larger the correction value for a same tone value of the original image or corresponding halftone dot size. Furthermore, the correction value may be dependent upon this tone value or corresponding halftone dot size to be printed. For example, depending on how dark the original image is or how large the corresponding halftone dots are, the correction value for a same layer may be made larger or smaller. Also the correction factor may vary with the number of layers deposited, e.g. there is initially a rapid reduction in size followed by a small reduction in size as the protruding part approaches the last (upper layer) layer.

Accordingly, the layers $L_0$ to $L_{N-1}$ applied underneath the top layer $L_N$ may be applied so as to give optimum support for the top layer $L_N$. Also, each layer has a relationship to the top layer to be formed, this relationship being dependent upon the exact algorithm for the correction factors. Furthermore, each dot should ideally exert the same pressure when printing, which can also be achieved by adjusting the layers underneath the top layer $L_N$. For example, different materials may be used to form the protruding elements 6 of the printing master 2. The stiffness of the final material, e.g. after cross-linking, hardening or solidifying, may be selected to give uniform properties to each protruding element 6 of the printing master 2 independent of its size.

Typically, the halftone dots 35 may be calculated from the contone image off-line and then stored for later printing. Optionally, the halftone dots 35 may be calculated on-the-fly, i.e. during printing. In the later case, only the original image and the image to be printed at a specific moment in time need to be stored.

Figure 8:
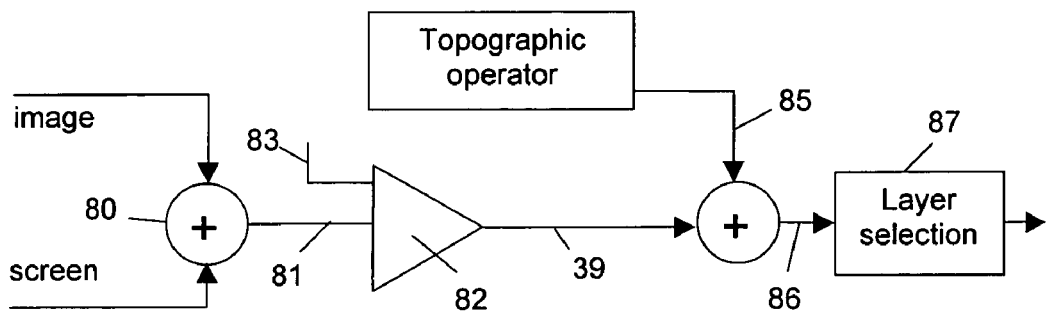
FIG. 8 is a diagrammatic overview of a second embodiment of a method for creating print masters according to the present invention.

According to an embodiment of the present invention, as shown very schematically in FIG. 8, in a first step halftone pixels 39 are calculated, by summing grey values of each image pixel 33 with a corresponding screen pixel 37 in a summation circuit 80, and by thresholding the summation result 81 in a comparator 82, e.g. by comparing the summation result 81 with a threshold value 83. Although reference is made here to circuits, it will be understood by the skilled person that this relates to functions and not necessarily to physical implementations. The latter may be in hardware or may be provided by a computing device programmed to carry out the respective functions. Hence, a computing device such as a microprocessor or a digital logic element such as a programmable gate array, a PAL, PLA or Field Programmable Gate Array may be programmed to carry out these functions.

The obtained halftone pixels 39 form halftone cells 38 comprise halftone dots 35 which are binary halftone dots of a certain size. Printing that size of binary halftone dots corresponds to a certain tone value. The transformation from a single layer halftone image containing halftone dots to a corresponding multi-layered 3-D structure of the printing master is obtained by correcting each halftone pixel 39 with a correction value 85 which has as parameter the position of the image layer in the layer stack, as will become clear from following examples. That way, binary halftone dots 35 are transformed into spread halftone dots 86. The transformation, or spreading, may be done by applying a smoothing algorithm or a spreading filter. Such a filter may be a digital filter which may be discrete in that it filters based on a finite number of values around a pixel of interest or it may be continuous, i.e. the digital filter extends over the complete area of the image and the values of each pixel contribute some value to the filtered pixel of interest. Such a spreading function or spreading filter may be described as a topographic operator. The transformation function is constructed so that the result depends on the height of the image layer in the layer stack. When printing, an image layer in the spread halftone dots 86 is selected by a layer selection device 87, and the right size of the halftone dot for that layer is printed. The layer selection may for example be done by a control unit such as e.g. a micro-controller or an FPGA.

This embodiment is exemplified in FIGS. 9 to FIG. 16. In a first step, a 1 dimensional spreading function 50 of a pixel is specified, as shown in FIG. 9a. In the example given, the 1 dimensional spreading function 50 of the pixel is described (the skilled person will appreciate that this can be extended to two dimensions, further details are given below) as follows: {0.2, 0.4, 0.6, 0.8, 1, 0.8, 0.6, 0.4, 0.2}. The "1" in this spreading function description means that, to create a dot corresponding to the size of a pixel of the recording system at a given pixel location 52, a dot is printed on that pixel position 52 for each of the layers. Neighbouring pixel locations 54 receive 80% of the layers, pixel locations 56 at a distance of 2 receive 60% of the layers, pixel locations 58 at a distance of 3 receive 40% of the layers, pixel locations 60 at a distance of 4 receive 20% of the layers, and pixel locations at a distance of 5 or more receive no layers. To build a 400 µm relief, for example 100 layers of 4 µm thick each may be stacked. In this case, 20% of the layers corresponds to 20 layers, 40% of the layers corresponds to 40 layers, and so on. In the example given, the slope of the 3D structure of the dot ultimately obtained will have an angle of 45°, but by changing the number of layers for a pixel at a distance from the dot to be printed, and thus the values of the number of layers in the 1 dimensional profile, the slope can be changed so as to be, for example, less steep for pixels further away from the dot to be printed, and steeper for pixels closer to the dot to be printed. An example of such a 1 dimensional profile could be e.g. {0.1, 0.2, 0.3, 0.5, 1, 0.5, 0.3, 0.2, 0.1}. Furthermore, more or less neighbouring pixels can be taken into account, in order to provide another kind of support. In the example given, a pixel and 4 neighbouring pixels to each side are taken into account, but this could be for example only 3 neighbouring pixels to each side, or 5 neighbouring pixels to each side, or any suitable number, depending on the required or desired support. Furthermore, the number of pixels taken into account on each side of the dot to be printed, does not need to be equal, nor do the numbers for neighbouring pixel locations in the spreading function description have to be the same in each direction, i.e. along each dimension of the image.

Figure 10:
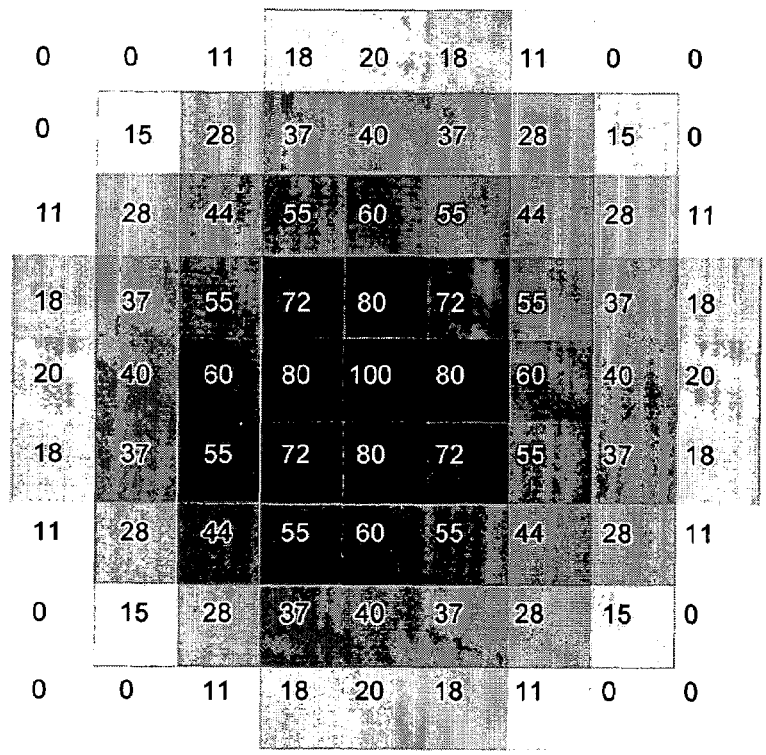
FIG. 10 is a schematic representation of a 2-dimensional filter kernel according to an embodiment of the present invention

From the 1 dimensional profile 50, a 2 dimensional, for example rotation invariant, filter kernel is created, which contains the 1 dimensional profile as a cross-section. This may be done by rotating the profile. In case of the first example given above, a 9×9 filter kernel is obtained, as shown in FIG. 10. The darker the areas in FIG. 10, the higher a corresponding pixel will be printed (i.e. the more layers will be printed at that pixel location onto the substrate of the printing master). In each area (corresponding to a pixel) in FIG. 10, a number is mentioned, which corresponds to the number of layers (in percentage of the total number of layers to be printed to obtain full height) that will be printed for a pixel at that location. For example, the solid black area in the center, corresponds to a pixel which receives 100% of the layers. The adjacent dark grey areas correspond to pixels which receive 80% of the layers. The white areas correspond to pixels which do not receive any layer.

In the example given above, the created filter kernel is point-symmetrical. This does not need to be the case: in other embodiments the created filter kernel may for example be line-symmetrical, or not symmetrical at all. In all cases the filter may be described as the application of a topographic operator.

Referring again to FIG. 8 the halftoned binary image pixels 39 is corrected or filtered with the created filter. For each filled (or black) pixel, the influence of this pixel is spread out to its neighbouring pixels according to the filter coefficients, i.e. according to the number of layers neighbouring pixels should receive as specified in the filter description. It is preferred if a non-linear filter is applied. For example, the influence of all neighbouring pixels at any pixel location is taken into account by selecting only the largest influence from any of these pixels at any point in the image and ignoring any others. This is shown schematically in FIG. 9b. In the upper image a singe pixel of the original binary image is spread using a topographic operator into a series of values on either side of the pixel. In the middle image the same is done for two single pixels so close together that their spread values for adjacent pixels interfere. However, only one of the values at the mid-position between the pixels is taken. In the lower image a series of adjacent pixels are spread. Within the pixel area itself, the largest value is always the pixel value itself so that this value is always taken. Outside the pixel area only the most significant value for adjacent pixels is taken—all others are ignored. The selection of only the most influential pixel rather than summing or averaging the influences from neighbouring pixels introduces a non-linear element into the filtering algorithm. Note, that this procedure can be modified by morphological operators as required, e.g. for spread and choke, as described above.

In one practical embodiment of this procedure, as the image is filtered, a previously stored pixel value is only modified (by replacement) by the effect of the spreading from neighbouring pixels if the calculated value for that pixel under consideration is larger than the previously stored value for that pixel. Advantages of this way of filtering (compared to a linear way of filtering) are that exact pixel values of the binary image are obtained at the filled pixel locations, and that influences from different pixels are not added (instead the maximum value of any of the influences reaching the pixel is taken). That way, a height map that indicates which pixels are to be printed at each layer is created.

Examples are given in FIG. 11 to FIG. 16.

Figure 11:
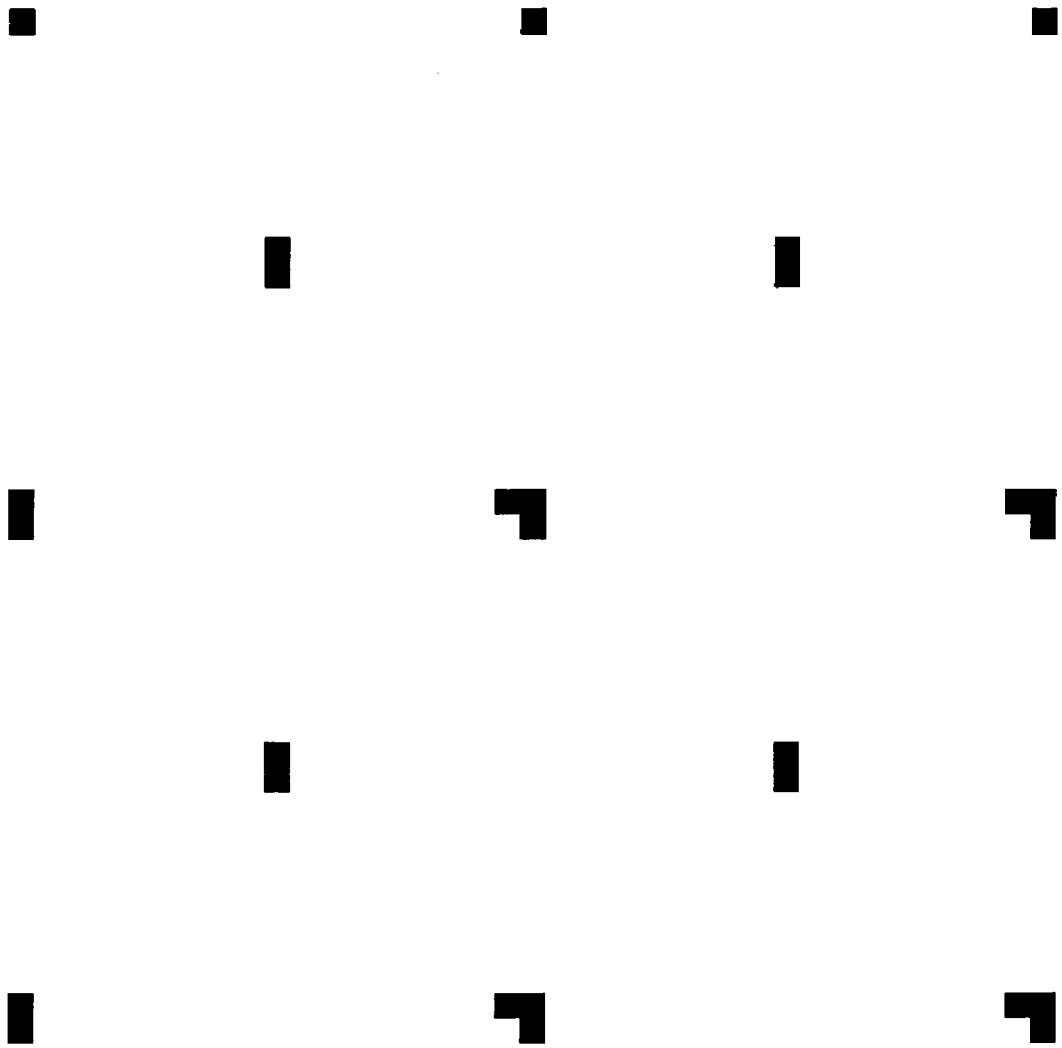
FIG. 11 is a binary image corresponding to a 1% tone at 720 dpi for 53 lpi screening.
Figure 12:
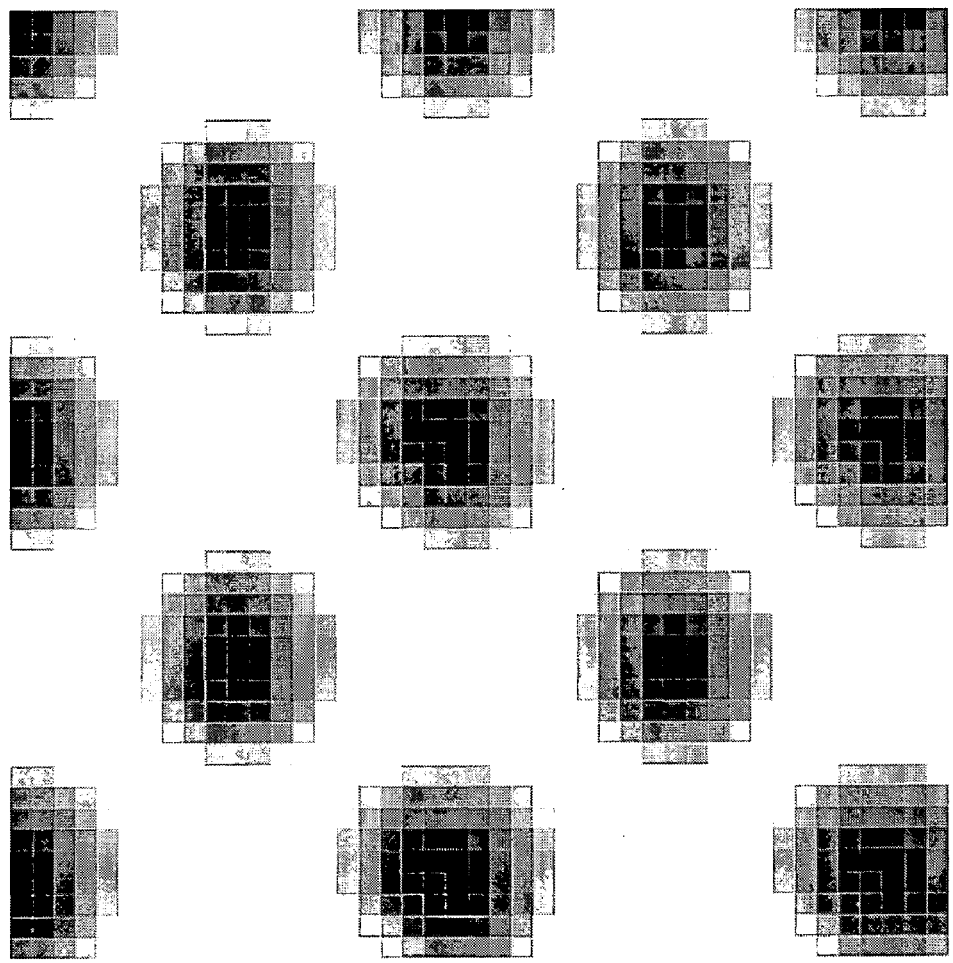
FIG. 12 is a height map obtained by filtering the binary image of FIG. 11 with the filter of FIG. 10 according to the present invention.

FIG. 11 shows a binary image of a 1% tone at 720 dpi for 53 lpi screening. FIG. 12 shows the corresponding height map, obtained by filtering the binary image of FIG. 11 with the filter of FIG. 10. 100% black in the height. map of FIG. 12 means that all layers will be printed. X% black means that X% of all layers will be printed.

Figure 13:
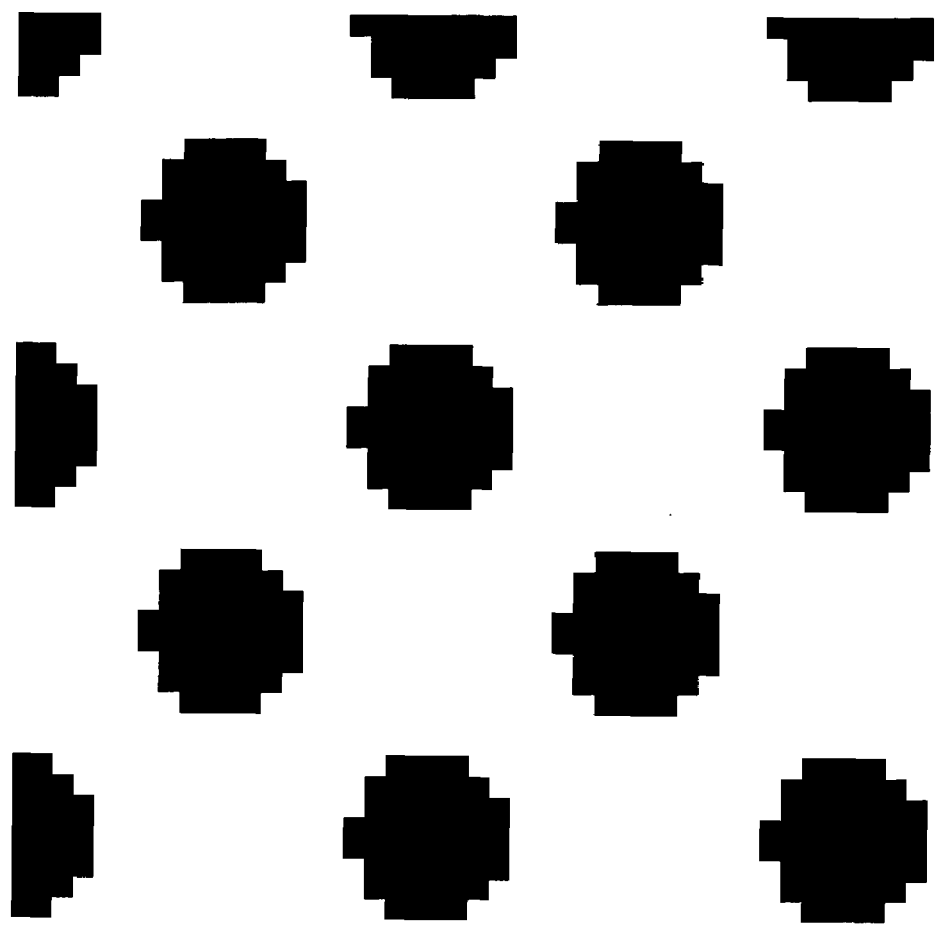
FIG. 13 is a binary image corresponding to a 25% tone at 720 dpi for 53 lpi screening.
Figure 14:
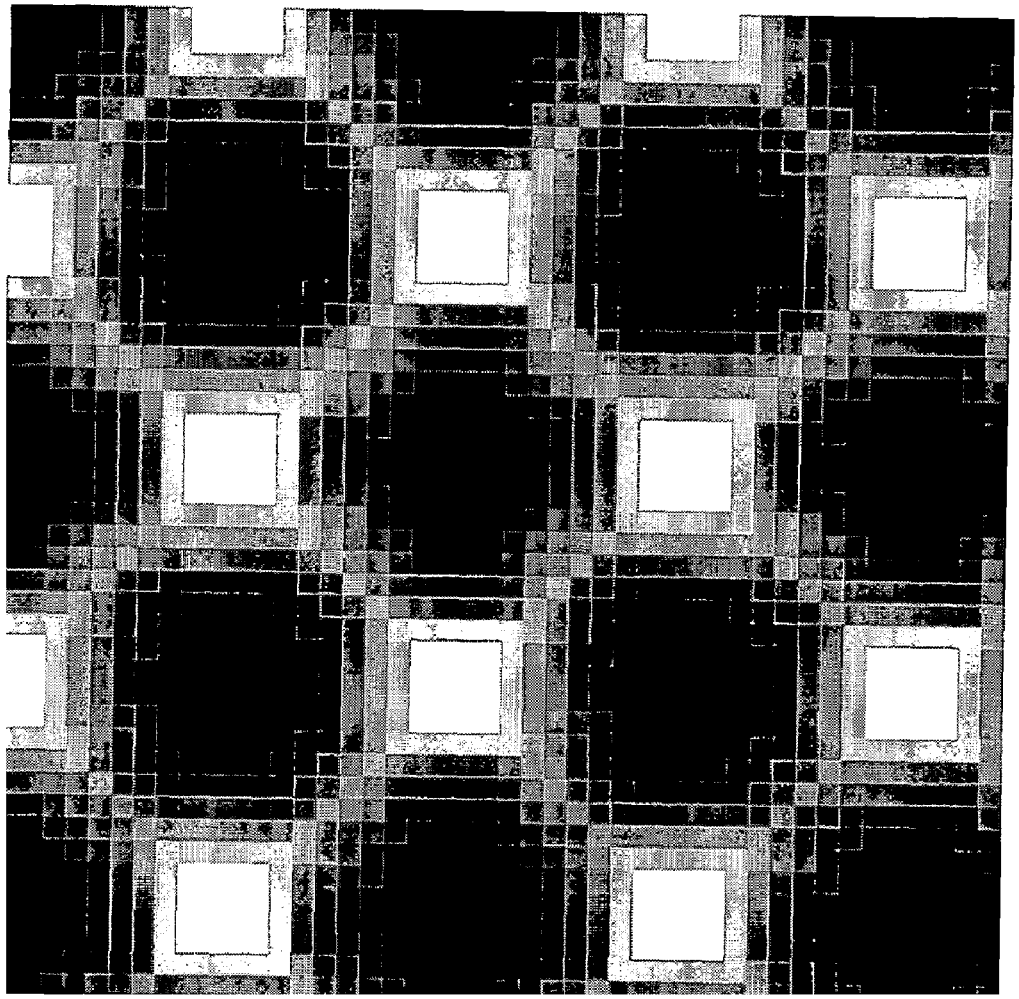
FIG. 14 is a height map obtained by filtering the binary image of FIG. 13 with the filter of FIG. 10 according to the present invention.

FIG. 13 shows a binary image of a 25% tone at 720 dpi at 53 lpi screening. FIG. 14 shows the corresponding height map, obtained by filtering the binary image of FIG. 13 with the filter of FIG. 10. Again, 100% black means that all layers will be printed, while white (i.e. 0% black) means that no layers will be printed.

Figure 15:
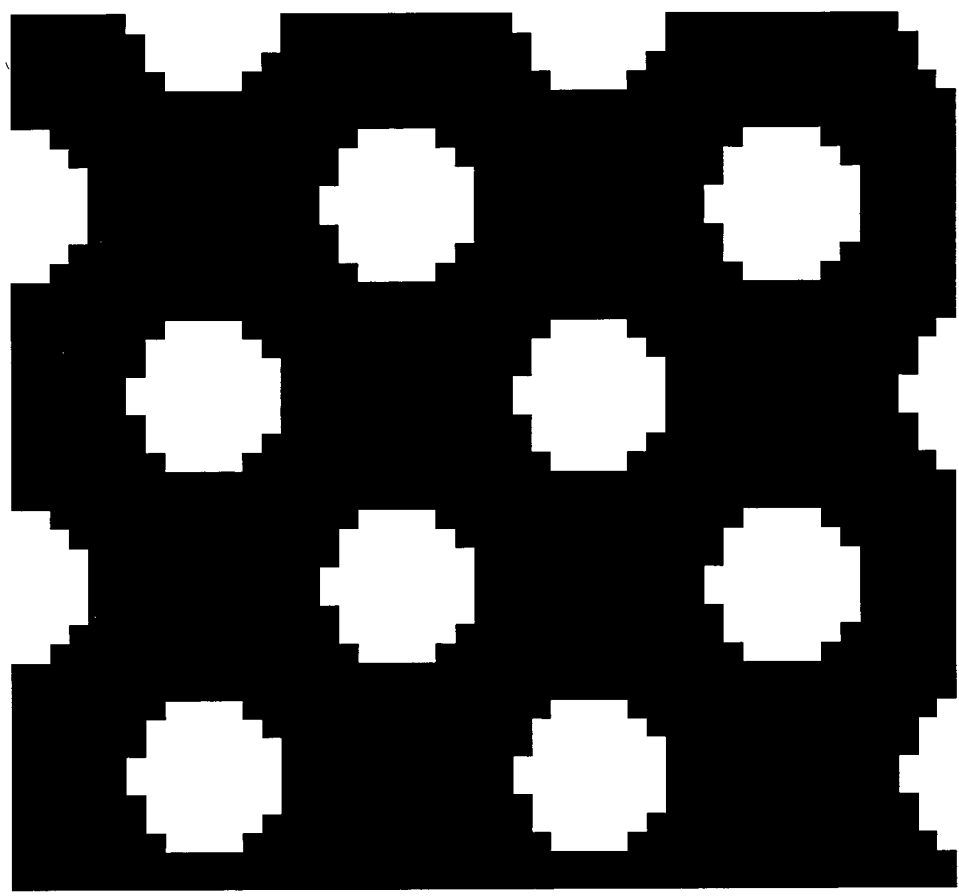
FIG. 15 is a binary image corresponding to a 75% tone at 720 dpi for 53 lpi screening.
Figure 16:
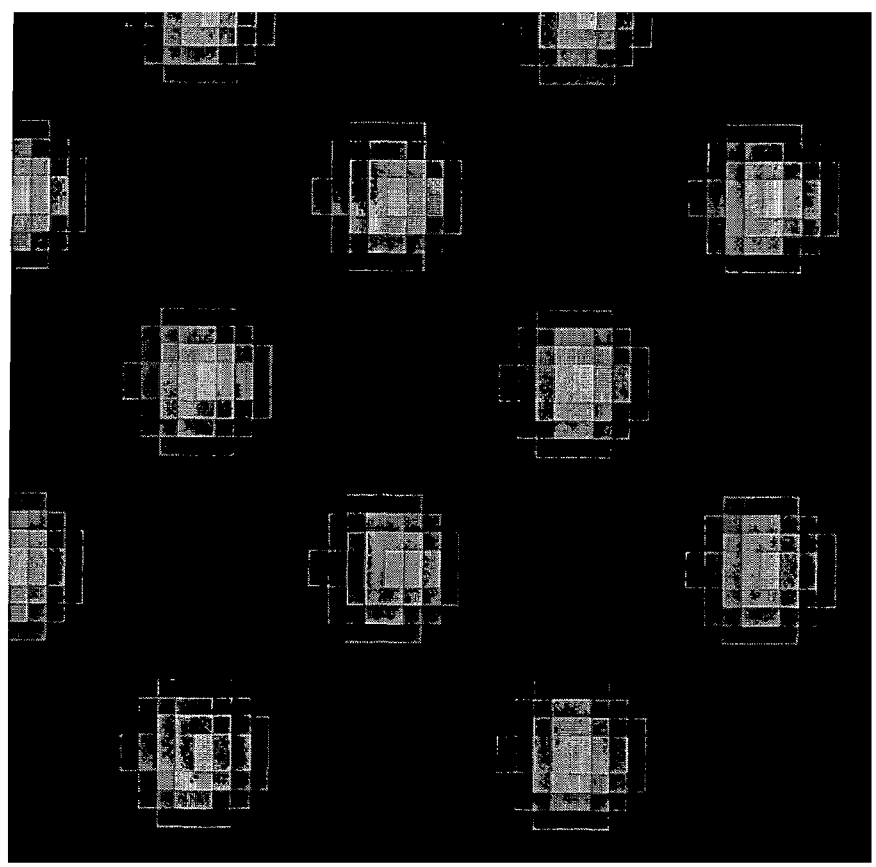
FIG. 16 is a height map obtained by filtering the binary image of FIG. 15 with the filter of FIG. 10 according to the present invention.

FIG. 15 shows a binary image of a 75% tone at 720 dpi at 53 lpi screening. FIG. 16 shows the corresponding height map, obtained by filtering the binary image of FIG. 15 with the filter of FIG. 10. It is to be noticed that no white areas are left in FIG. 16, i.e. that every pixel location has at least one layer printed on it.

Figure 17:
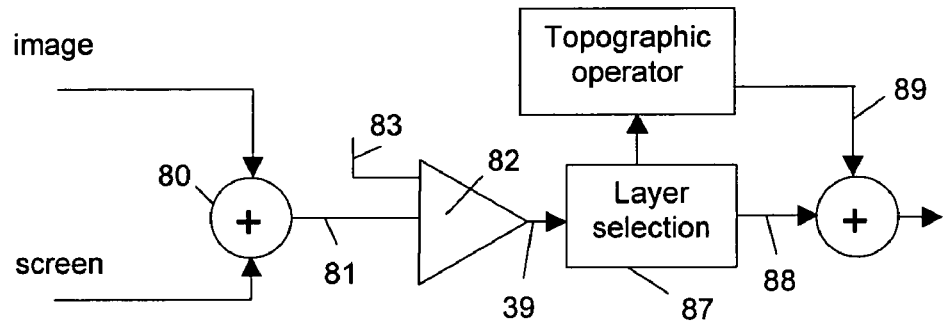
FIG. 17 is a diagrammatic overview of a third embodiment of a method for creating print masters according to the present invention.
Figure 9A:
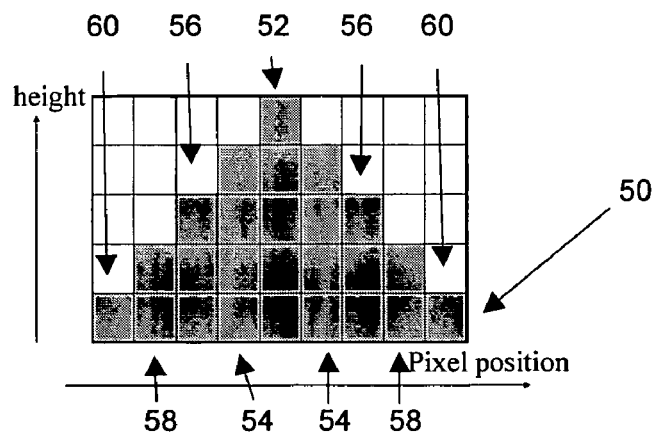
FIG. 9a is a schematic representation of an embodiment of a 1-dimensional dot profile according to the present invention and, FIG. 9b shows application of this kernel in accordance with an embodiment of the present invention.
Figure 9B:
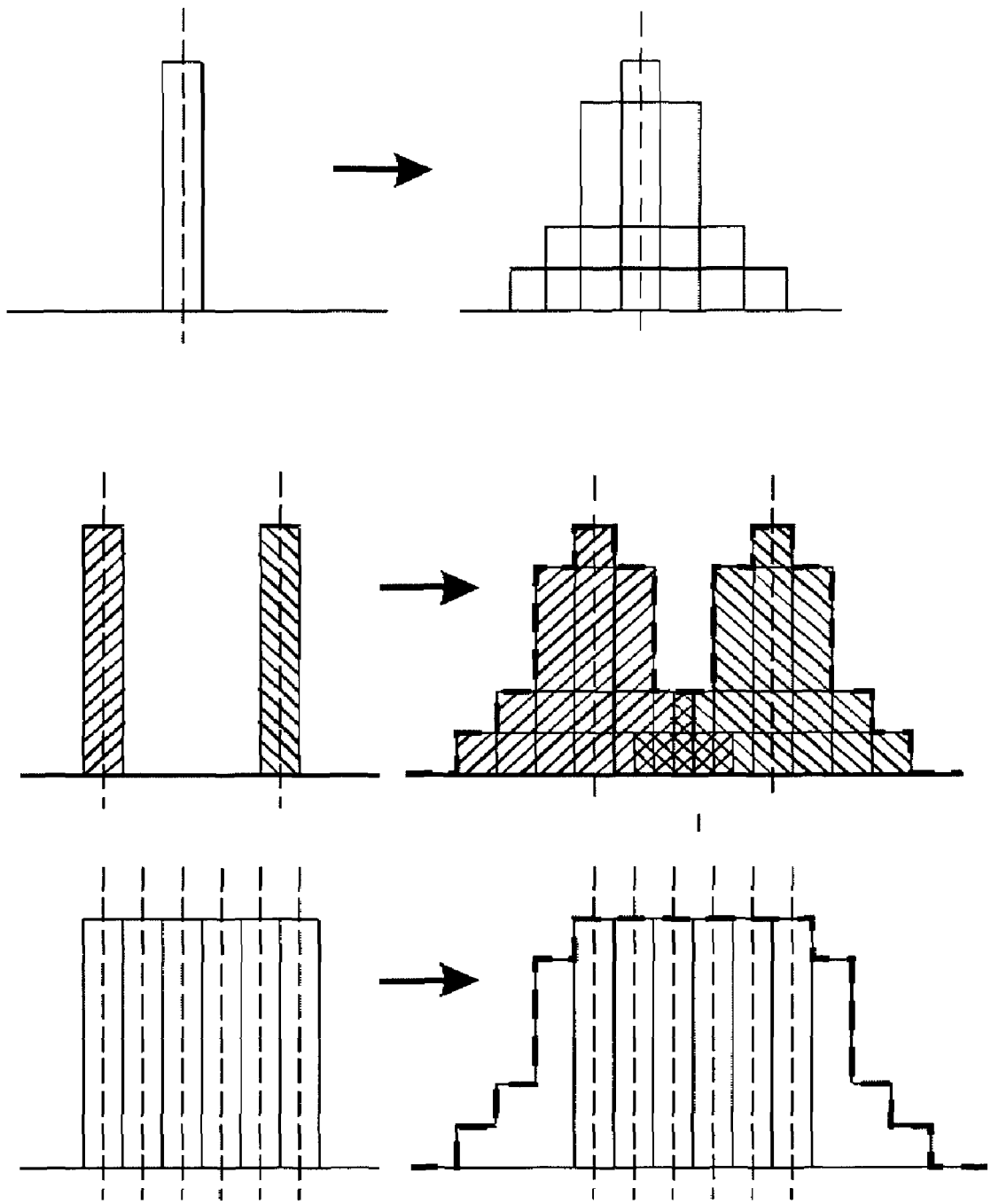

According to another embodiment of the present invention, as shown in FIG. 17, in a first step halftone pixels 39 making up halftone cells 38 comprising halftone dots 35 are calculated, by summing grey values of each image pixel 33 with a corresponding screen pixel 37 in a summation circuit 80, and by thresholding the summation result 81 in a comparator 82, e.g. by comparing the summation result 81 with a threshold value 83. An image layer is selected in the binary halftone pixels 39 of the halftone dot 35 by means of a layer selection device 87. The selected layer 88 of the binary halftone dot 35 is corrected with correction values 89 dependent on the image layer. Or, with other words, a slice of each binary halftone dot 35 is transformed into a spread slice. In this case, the image is spread depending on the level of printing, which gives more flexibility to obtain a desired profile or slope 16 for a protruding part 6. The top layer should be an exact copy of the binary image. At the lower layers, at least the same pixels as in the top layer need to be printed. The stacking constraint needs to be taken into account.

Figure 18:
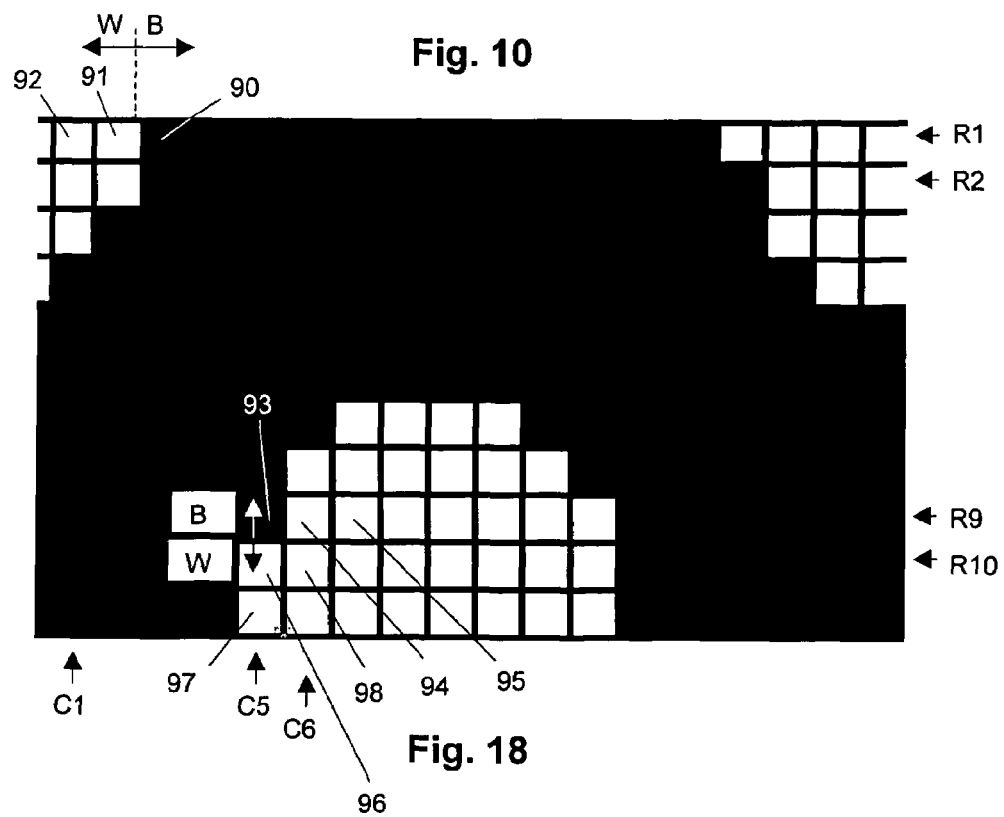
FIG. 18 is an enlarged portion of FIG. 15.

According to yet another embodiment of the present invention, an original image is halftoned, thus forming a pattern of binary dots. An example of such a binary image is e.g. shown in FIG. 15, and a detail thereof is shown in FIG. 18. The halftoned image is now scanned row by row and column by column, and edges of the binary dots are detected in a manner known to a person skilled in the art. For example, as the image is traversed all edges are labeled with a black/white label to show in which direction a transition from black to white takes place. At the side of the black/white edges labeled "white", grey values are added in. Starting from a halftoned image, a filtered image is obtained as follows.

In a first part of the method, after black/white labeling, the halftoned image is scanned row by row, starting with row R1, then row R2, and so on. Every time a black/white edge is detected, the following steps are taken (the example given takes into account 3 pixels for determining the grey values, but of course another number of pixels can be taken into account):

at that side of the edge which is labeled "black", the pixels which in the original image were black are also black in the filtered image—this is 100% black in the example given, for example for pixel 90,
  at that side of the edge which is labeled "white", a filter operation is carried out to obtain grey values; e.g. a first pixel 91 next to the edge gets a value which corresponds to its original value plus 50% of the value of its neighbouring pixel 90 in the direction of the edge—this is 50% black in the example given, a second pixel 92 at a second pixel location from the edge gets a value which corresponds to its original value plus 50% of the original value of the neighbouring pixel 91 in the direction of the edge—this is 0% black in the example given.

When for every row R1, R2, . . . grey levels have been introduced at the white sides of black/white transitions (in the example given in FIG. 18 also e.g. pixels 94, 96 and 97 got a value of 50% black), the same is done on a column by column base. There is preferably not started from the original halftoned image, but from the image obtained by the previous step, i.e. from the image with grey values formed by scanning the halftoned image row by row. For example pixels 93, 94, 95 are respectively 100% black, 50% black, 0% black after scanning and transforming row R9. After scanning every row the newly introduced grey pixels are now labeled in the column direction to show in which direction a grey to white transition takes place. For column $C_5$ for example, a black to white transition in column direction was labeled between row R9 and row R10, with the black side of the edge at row R9, and a grey to white transition is now labeled in column C6 between row R9 and R10, with the white side of the edge at row R10. The following steps are taken:

at that side of the black/white edge which is labeled "black", the pixels which in the original image were black are also black in the filtered image—this is 100% black for pixel 93 in the example given, at that side of the black/white edge which is labeled "white", a filter operation is carried out to obtain grey values; e.g. a first pixel 96 next to the edge gets a value which corresponds to its original value plus 50% of the value of its neighbouring pixel 93 in the direction of the edge—the original value of pixel 96 was 0% black in the example given, so now pixel 96 gets a value of 50% black; this value is compared with the value obtained by the previous step (when scanning the image on a row by row basis), and the highest value is retained. A second pixel next to the edge (pixel 97 in FIG. 18) gets a value which corresponds to its original value plus 50% of the original value of the neighbouring pixel 96 in the direction of the edge—this is 0% black in the example given; this value is compared with the value obtained by the previous step (when scanning the image on a row by row basis), and the highest value is retained, which is 50% black in this particular example. at that side of the grey/white edge which is labeled "white", a further filter operation is carried out to obtain grey values; e.g. a first pixel 98 at the white side next to the grey/white edge gets a value which corresponds to its original value plus 50% of the actual value of its neighbouring pixel 94 in the direction of the edge—the actual value of pixel 94 is 50% black in the example given, so now pixel 98 gets a value of 25% black; this value is compared with the value obtained by the previous step (when scanning the image on a row by row basis), and the highest value is retained, which is 25% black in this particular example.

In all cases the operations described above to spread the edges of the binary image may be described as application of a topographic operator on the binary image.

When forming the print master, the grey values of the pixels are not interpreted as densities, but as heights, and then halftone dots with these heights are formed. 50% black means that 50% or the total height of the relief is formed. Putting grey levels next to an edge means, according to the present invention, that pixels with less height will be printed onto the substrate of the printing master.

It will be appreciated from the above that as the tone value of the original image area becomes darker the size of the halftone dot 35 to be printed gets larger. Thus, the size and form of a dot grows in a certain way when going from white to black, e.g. starting with no black halftone pixels 39 for white, then one halftone pixel 39 is printed for a first level of grey, then two halftone pixels 39 are printed for a darker grey and so on. Exactly how the dot grows with increasing image density can be important for a variety of reasons. One reason is that certain shapes are more stable during 3-D printing than others.

Figure 19:
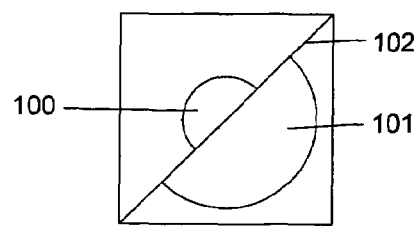
FIG. 19 illustrates partial dotting.

A special spreading function can be considered in case of partial dotting, as described in Henry R. Kang, "Digital color halftoning", p.251-251, and as represented in FIG. 19. A partial dot is a combination of full dots, e.g. in FIG. 19 the partial dotting is obtained by using half of a smaller dot 100 and half of a larger dot 101 along a large contrast edge 102. A partial dot implies a non-uniform area with fine details in the input. In this case of partial dotting, the correction value according to the present invention may be based on the underlying contone.

Furthermore, the method of the present invention may comprise a pre-compensation for subsequent dot deformation. This dot deformation will happen when a flexographic printingplate is taped on a drum, which makes e.g. a circular area on a flexographic printing plate look like an oval when the flexographic printing plate is taped on the drum. Therefore, instead of a circular area, an oval area is finally printed. This can be remedied by pre-compensation, i.e. by providing e.g. an oval area on the flexographic printing plate which deforms into a circular area when the plate is taped on the drum. Such a transform of the shape of pixel areas to be printed may be called a morphological transform.

Figure 20:
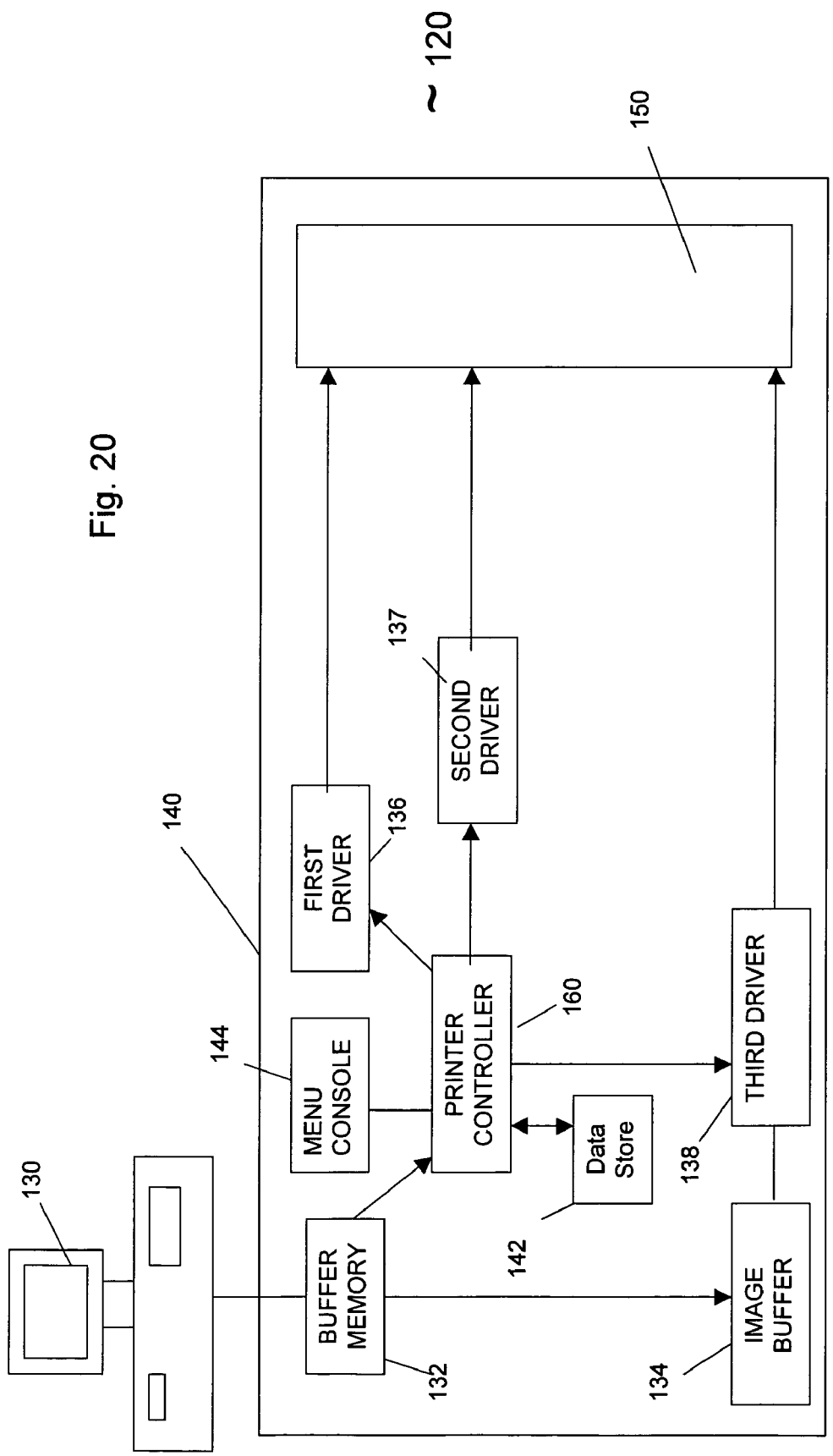
FIG. 20 is a schematic representation of a 3-D printing system in accordance with an embodiment of the present invention.

FIG. 20 is a highly schematic block diagram of an electronic control system of a 3-D printing system 120 which can be used with the present invention. System 120 comprises a computing device 130, a 3-D printer 140 having a printer controller 160 and a 3-D printhead module 150. The 3D-printer 140 can be any suitable 3D-printing machine which is able to lay down a 3D-structure for a printing master. The printer 140 may include a buffer memory 132 for receiving a print file in the form of signals from a host computer 130, an image buffer 134 for storing printing data, and a printer controller 160 that controls the overall operation of the 3D-printer 140. The printer controller 160 may control one or more printer drivers 136-138 for driving the 3D-printhead module 150 and associated transport mechanisms. A data store 142 (local memory) and a menu console 144 for setting parameters of the printer 140 from a console on the printer may also be included.

In one embodiment of the present invention, the host computer 130 is any suitable programmable computing device such as personal computer with a Pentium IV microprocessor supplied by Intel Corp. USA, for instance, with memory and a graphical interface such as Windows 98, 2000, ME, XP as supplied by Microsoft Corp. USA. Such a computer includes a microprocessor and associated memory, e.g. volatile RAM, non-volatile read/write memory such as a hard disc as well as non-volatile read only memory, ROM. For example, the memories may be used for storing or buffering source images, intermediate arrays of data and calculations, as well as the final print file. Software programmes are loaded into the computer 130 for carrying out any of the digital processing methods of the present invention and to provide a print file to the 3D-printer 140. For example, the software may include code, which when executed on a computing device creates a print file for a printing master using a 3-dimensional printing system, the print master comprising a plurality of 3-D structures printed on a substrate, each 3-D structure representing one or more pixels to be printed using the printing master. The software code when executed may allow for receiving a source image comprising a plurality of image pixels, and generating a filtered image by applying one or more topographic operators to the source image to generate for every image pixel a representation of a pixel height profile, the pixel height profile corresponding to a cross-section through a 3-D structure which is to be formed on the printing master by 3-D printing. In such code the topographic operator has the following properties:—the heights of all 3-D structures in the pixel height profile which will form a printing surface all lie substantially within one surface with reference to the substrate,—any cross-section through a solid section at a second level in the 3-D structure which is closer to the substrate than a first level has a an area which is equal to or larger than the area of the cross-section of the 3-D structure at the first level.

The software code when executed will also allow for generation of definitions of a plurality of image layers from the filtered image for printing the 3-D structures using a 3-dimensional printing system.

The software code may be adapted to receive the source image as a binary image comprising pixels having a first value and remaining areas having a second value. The software may also be adapted to receive the source image as a plurality of image pixels each having a contone value, and to apply the topographic operator by providing a digital halftone screen comprising a plurality of screen pixels, every screen pixel corresponding to an image pixel, and to receive a set of correction values which are a function of the image layer, to threshold the contone values of the source image pixels with the screen function values of the halftone screen pixels and with the layer depending correction values to generate halftone dots. The software when executed may generate the halftone dots for the plurality of image layers on-the-fly. The software may also, when executed, be adapted to generate binary halftone dots from a source image, thereafter to transform the binary halftone dots into blurred halftone dots comprising a plurality of blurred halftone dot layers, and thereafter to choose a blurred halftone dot layer to be printed as an image layer. The software when executed may be adapted to first obtain binary halftone dots comprising a plurality of halftone dot layers, thereafter to choose a halftone dot layer of the binary halftone dots, and transform the selected halftone dot layer into a blurred halftone dot layer to be printed as image layers.

Accordingly, the present invention includes a computer program product which provides the functionality of any of the methods according to the present invention when executed on a computing device. Further, the present invention includes a data carrier such as a CD-ROM or a diskette which stores the computer product in a machine readable form and which executes at least one of the methods of the invention when executed on a computing device. Nowadays, such software is often. offered on the internet or a company intranet for download, hence the present invention includes transmitting the printing computer program product according to the present invention over a local or wide area network. The computing devices on which the computer program product is executed may include one of a microprocessor based device or a (F)PGA, PAL or PLA based device.

Figure 21:
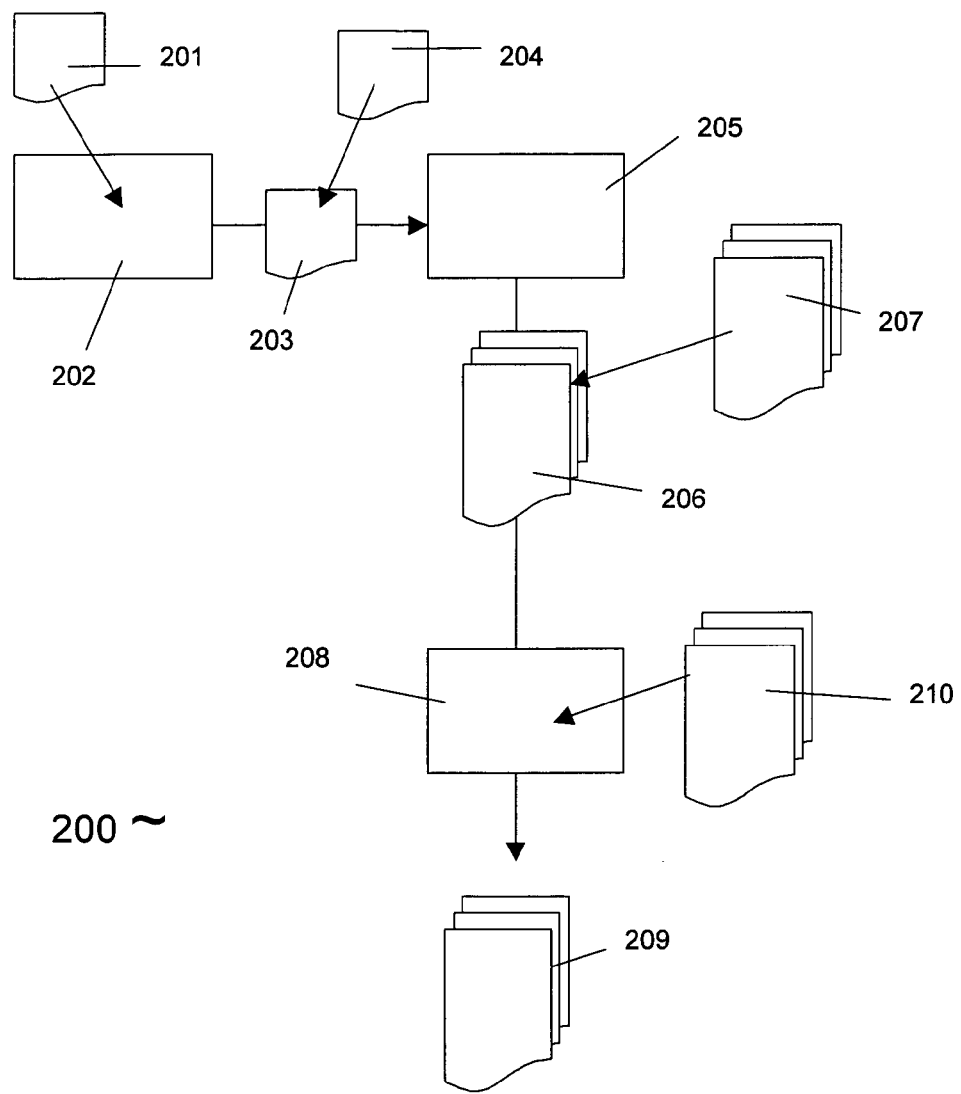
FIG. 21 is a diagrammatic representation of a suite of programs for generating a pint file for a 3-D system in accordance with an embodiment of the present invention.

The present invention also includes a system for creating a print file for printing printing masters by means of a 3-D er which allows input of a variety of images. To deal with a variety of images, e.g. analog, contone, hybrid contone and binary, or binary images, a suite of software subroutines or modules is included within the scope of the present invention which can transform any one of a number of the above images. A schematic diagram of this suite 200 is shown in FIG. 21. The suite 200 comprises a set of subroutines or software modules 202, 205, 208, which can be used individually or sequentially to process an image. An analog image 201 is digitised, for instance in a scanner using a first software module 202 to form a contone image 203 or a hybrid image comprising contone images and a binary part, e.g. text. Alternatively, a contone image or a hybrid contone/binary image 204 may be input directly. The contone or hybrid contone/binary image 203, 204 is then converted into one or more binary images 206 using a second software module 205. Generally, the number of binary images will equal the number of colours required for printing and therefore the number of printing masters required. Alternatively, one or more binary images 207 may be input directly. The one or more binary images 206, 207 are then transformed using the third software module 208 into the set of print files 209 by application of the topographic and optional morphologic operators described above. The present invention also includes input of a source image as defined by any of the matrices 5-7 above, i.e. those containing implicit height information, followed by application of a topographic operator to generate the final print files. Such a topographic operator may provide transformations such as artificially increasing the height of each pixel to allow for a planarizer, lowering the height of some pixel structures to avoid Euler buckling of these pixel structures on the printing press, changing the areas of pixels within each layer to generate 3D-structures with different side slopes, slicing the 3-D structures implicitly coded into source image 210 to generate more or less layers to be printed, etc.

While the invention has been shown and described with reference to a preferred embodiment, it will be understood by those skilled in the art that various changes or modifications in form and detail may be made without departing from the scope and spirit of this invention. For example, the printer controller 160 may include a computing device, a microprocessor based device as for instance a microcontroller, or programmable controller such as (F)PGA, PAL or PLA based devices. The use of an FPGA allows subsequent programming of the printer device, e.g. by downloading the required settings for the FPGA. Instead of using the host computer 130 to execute the digital image processing programs, the printer 140 may be adapted to carry out these digital image processing tasks according to any of the methods of the present invention. In particular the programmable printer controller may include software (as described above) which when executed carries out the methods described above with respect to the host computer.

It is to be understood that although specific constructions and configurations, as well as materials, have been discussed herein for devices according to the present invention, deviations can be made therein without departing from the spirit and scope of the present invention. For example, instead of the print master of the present invention being used as a flexographic printing master, it can also be used for gravure printing. In this case, the protruding parts are preferably as small as possible (as not the protruding parts but the recesses or wells are used for printing), depending on the dot sizes to be printed. Therefore, when making the protruding parts, for example UV curable inks must be used, which become very hard when cured. Alternatively, the printing structure of the present invention can be used for letterpress printing, or as a stamp for example.

The invention claimed is:

1. A method for creating a print file for making a printing master used for contact printing, by printing a 3-D print using a 3-D printing system, the 3-D print including a plurality of 3-D structures printed on a substrate, each 3-D print structure having a height with respect to the substrate, the method comprising the steps of:
   providing a two-dimensional source image including a plurality of image pixels;
   generating a filtered image by applying a topographic operator to the source image to generate for every image pixel a representation of a pixel height profile value, each pixel height profile value of the filtered image corresponding to a cross-section layer through the 3-D print structure which is to be formed by 3-D printing, thereby including in the filtered image definitions of a plurality of image layers to be printed using the 3-D printing system, the topographic operator having the properties to ensure that:
   any cross-section through a solid section of the formed 3-D print structure at a second level in the 3-D print structure which is closer to the substrate than a first level has an area which is equal to or larger than the area of the cross-section of the 3-D print structure at the first level; and
   the heights of all 3-D print structures in the pixel height profile values which define the printing contact surface all lie substantially within a single printing surface above the substrate before the 3-D printing of the 3-D print structures;
   slicing the picture height profile values of the filtered image into a plurality of image layers; and
   outputting the print file based on the plurality of image layers; wherein
   the step of applying the topographic operator includes:
      generating binary halftone dots from the source image;
      thereafter transforming the binary halftone dots into blurred halftone dots having a height profile in the form of a plurality of blurred halftone dot layers; and
      thereafter choosing a blurred halftone dot layer to be printed as an image layer.

2. The method according to claim 1, wherein the step of transforming the binary halftone dots into the plurality of blurred halftone dot layers includes:
   applying a smoothing algorithm or a blurring filter.

3. The method according to claim 1, wherein the transforming step is a function of the height of the image layer above the substrate.

4. The method according to claim 1, wherein the step of generating the binary halftone dots is based on one of amplitude modulation, frequency modulation, a combination of amplitude modulation and frequency modulation, and stochastic modulation.

5. The method according to claim 1, wherein for each image pixel under consideration the generation of the height profile of neighboring image pixels provides one or more height values at the image pixel under consideration, and the height value assigned to the image pixel under consideration is determined by the largest height value provided by any one of the image pixels including the image pixel under consideration.

6. The method according to claim 1, further comprising:
   applying a morphological operator either before, at the same time as, or at a later time than applying the topographic operator.

7. The method according to claim 6, wherein the step of applying the morphological operator pre-compensates for subsequent deformation of a dot to be printed.

8. A method of printing a 3-D print by printing the 3-D print onto a substrate using a 3-D printer using a print file derived by the method according to claim 1.

9. A method for creating a print file for making a printing master used for contact printing, by printing a 3-D print using a 3-D printing system, the 3-D print including a plurality of 3-D structures printed on a substrate, each 3-D print structure having a height with respect to the substrate, the method comprising the steps of:
   providing a two-dimensional source image including a plurality of image pixels;
   generating binary halftone dots from the source image;
   generating a blurred image by applying a topographic operator to the binary halftone dots to generate for every image pixel a representation of a pixel height profile value, each pixel height profile value of the blurred image corresponding to a cross-section layer through the 3-D print structure which is to be formed by 3-D printing, thereby including in the blurred image definitions of a plurality of image layers to be printed using the 3-D printing system, the topographic operator having the properties to ensure that:
  any cross-section through a solid section of the formed 3-D print structure at a second level in the 3-D print structure which is closer to the substrate than a first level has an area which is equal to or larger than the area of the cross-section of the 3-D print structure at the first level; and
  the heights of all 3-D print structures in the pixel height profile values which define the printing contact surface all lie substantially within a single printing surface above the substrate before the 3-D printing of the 3-D print structures;
slicing the picture height profile values of the image into a plurality of image layers; and
outputting the print file based on the plurality of image layers.

10. The method according to claim 9, wherein the step of applying the topographic operator includes:
  applying a smoothing algorithm or a blurring filter.

11. The method according to claim 9, wherein the step of generating the blurred image is a function of the height of the image layer above the substrate.

12. The method according to claim 9, wherein the step of generating binary halftone dots is based on one of amplitude modulation, frequency modulation, a combination of amplitude modulation and frequency modulation, and stochastic modulation.

13. The method according to claim 9, wherein for each image pixel under consideration the generation of the height profile of neighboring image pixels provides one or more height values at the image pixel under consideration, and the height value assigned to the image pixel under consideration is determined by the largest height value provided by any one of the image pixels including the image pixel under consideration.

14. The method according to claim 9, further comprising:
  applying a morphological operator either before, at the same time as, or at a later time than applying the topographic operator.

15. The method according to claim 14, wherein the step of applying the morphological operator pre-compensates for subsequent deformation of a dot to be printed.

16. A method of printing a 3-D print by printing the 3-D print onto a substrate using a 3-D printer using a print file derived by the method according to claim 9.

* * * * *